(12) United States Patent
Ross et al.

(10) Patent No.: US 10,348,715 B2
(45) Date of Patent: *Jul. 9, 2019

(54) COMPUTER-IMPLEMENTED SYSTEMS AND METHODS OF DEVICE BASED, INTERNET-CENTRIC, AUTHENTICATION

(71) Applicant: Probaris Technologies, Inc., Philadelphia, PA (US)

(72) Inventors: Brian G. Ross, Haddon Heights, NJ (US); Benjamin P. Hollin, Philadelphia, PA (US); Charles J. Durkin, West Chester, PA (US); Harry D. Anuszewski, Philadelphia, PA (US); Joseph A. Fischetti, Aldan, PA (US)

(73) Assignee: Probaris Technologies, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,755

(22) Filed: Oct. 6, 2017

(65) Prior Publication Data
US 2018/0034796 A1    Feb. 1, 2018

Related U.S. Application Data

(63) Continuation of application No. 14/858,087, filed on Sep. 18, 2015, now Pat. No. 9,813,400.
(Continued)

(51) Int. Cl.
*H04L 29/06* (2006.01)
*G06F 21/41* (2013.01)
(Continued)

(52) U.S. Cl.
CPC .............. *H04L 63/08* (2013.01); *G06F 21/31* (2013.01); *G06F 21/41* (2013.01);
(Continued)

(58) Field of Classification Search
CPC .......................... H04L 63/0815; H04L 63/08; H04L 63/0823; H04L 63/0442; H04W 12/06; G06F 21/41; G06F 21/31
See application file for complete search history.

(56) References Cited

U.S. PATENT DOCUMENTS

| 6,005,939 A | 12/1999 | Fortenberry et al. |
| 6,725,269 B1 | 4/2004 | Megiddo |

(Continued)

OTHER PUBLICATIONS

Thomas, Ivonne, and Christoph Meinel. "An identity provider to manage reliable digital identities for SOA and the web." Proceedings of the 9th Symposium on Identity and Trust on the Internet. ACM, 2010, pp. 26-36. (Year: 2010).*

(Continued)

*Primary Examiner* — Kari L Schmidt
(74) *Attorney, Agent, or Firm* — Duane Morris LLP

(57) ABSTRACT

Systems and computer-implemented methods for authorizing respective access by each of a plurality of Internet users to a respective one or more Internet services provided by each of a plurality of Internet service providers. A system includes a processor, and non-transient computer readable storage media, at a single identity provider. The storage media is encoded with program code executable by the processor for requiring an identity provider application residing on each of a plurality of devices to create a respective authentication token that is specific to a respective identifier and user credential of a respective Internet user, a respective device identifier, and the respective identity provider application, and for authorizing respective access by the plurality of Internet users to a respective requested one of the Internet services provided by each Internet service provider using the respective created authentication tokens and respective identifiers for each of the respective requested Internet services.

20 Claims, 25 Drawing Sheets

Related U.S. Application Data

(60) Provisional application No. 62/076,637, filed on Nov. 7, 2014.

(51) Int. Cl.
  *G06F 21/31* (2013.01)
  *H04W 12/06* (2009.01)
  *H04L 29/08* (2006.01)

(52) U.S. Cl.
  CPC ...... *H04L 63/0442* (2013.01); *H04L 63/0815* (2013.01); *H04L 63/0823* (2013.01); *H04W 12/06* (2013.01); *H04L 67/02* (2013.01)

(56) References Cited

U.S. PATENT DOCUMENTS

| | | | |
|---|---|---|---|
| 6,772,336 B1 | 8/2004 | Dixon, Jr. | |
| 7,194,764 B2* | 3/2007 | Martherus | G06F 21/41 726/3 |
| 7,299,364 B2 | 11/2007 | Noble et al. | |
| 7,577,834 B1 | 8/2009 | Traversat et al. | |
| 8,108,920 B2 | 1/2012 | Spelman et al. | |
| 8,296,562 B2 | 10/2012 | Williams et al. | |
| 8,499,153 B2 | 7/2013 | Ritola et al. | |
| 8,973,099 B2 | 3/2015 | Reeves, Jr. et al. | |
| 9,208,304 B2 | 12/2015 | Hong et al. | |
| 9,503,452 B1 | 11/2016 | Kumar et al. | |
| 10,129,231 B2* | 11/2018 | Anderson | H04L 67/104 |
| 2002/0144108 A1* | 10/2002 | Benantar | H04L 63/0823 713/156 |
| 2003/0163733 A1* | 8/2003 | Barriga-Caceres | G06F 21/33 726/5 |
| 2003/0221126 A1* | 11/2003 | Berman | H04L 63/0823 726/14 |
| 2003/0236975 A1* | 12/2003 | Birk | H04L 63/0823 713/156 |
| 2004/0171399 A1 | 9/2004 | Uchida et al. | |
| 2005/0074123 A1 | 4/2005 | Cromer et al. | |
| 2005/0074126 A1 | 4/2005 | Stanko | |
| 2005/0228986 A1 | 10/2005 | Fukasawa et al. | |
| 2005/0289153 A1 | 12/2005 | Pabla et al. | |
| 2006/0053296 A1 | 3/2006 | Busboom et al. | |
| 2006/0174104 A1 | 8/2006 | Crichton et al. | |
| 2007/0214272 A1 | 9/2007 | Isaacson | |
| 2008/0046983 A1 | 2/2008 | Lester et al. | |
| 2008/0134295 A1 | 6/2008 | Bailey et al. | |
| 2008/0209338 A1 | 8/2008 | Li | |
| 2008/0229384 A1 | 9/2008 | Hodgkinson et al. | |
| 2008/0256617 A1 | 10/2008 | Cartwell | |
| 2009/0113543 A1 | 4/2009 | Adams et al. | |
| 2009/0205035 A1 | 8/2009 | Sermersheim et al. | |
| 2011/0067095 A1 | 3/2011 | Leicher et al. | |
| 2011/0119747 A1 | 5/2011 | Lambiase | |
| 2012/0159603 A1 | 6/2012 | Queck | |
| 2013/0019299 A1* | 1/2013 | Vepsalainen | H04L 9/3228 726/8 |
| 2013/0086657 A1 | 4/2013 | Srinivasan et al. | |
| 2013/0268999 A1 | 10/2013 | Kiang et al. | |
| 2013/0312079 A1 | 11/2013 | McCallum | |
| 2013/0318354 A1 | 11/2013 | Entschew et al. | |
| 2014/0040991 A1 | 2/2014 | Potonniee et al. | |
| 2014/0082715 A1 | 3/2014 | Grajek et al. | |
| 2014/0215589 A1 | 7/2014 | Dietrich et al. | |
| 2014/0257999 A1 | 9/2014 | Garcia-Martinez | |
| 2014/0281506 A1 | 9/2014 | Redberg et al. | |
| 2015/0089621 A1 | 3/2015 | Khalid et al. | |
| 2015/0106908 A1 | 4/2015 | Carpenter et al. | |
| 2015/0127546 A1 | 5/2015 | Saxena et al. | |
| 2015/0288522 A1 | 10/2015 | McCoy et al. | |
| 2016/0119323 A1 | 4/2016 | Krishna | |
| 2018/0152439 A1* | 5/2018 | Hande | H04L 63/0815 |

OTHER PUBLICATIONS

B. Leiba, "OAuth Web Authorization Protocol," in IEEE Internet Computing, vol. 16, No. 1, pp. 74-77, Jan.-Feb. 2012. (Year: 2012).*

J. Bonneau, C. Herley, P. C. v. Oorschot and F. Stajano, "The Quest to Replace Passwords: A Framework for Comparative Evaluation of Web Authentication Schemes," 2012 IEEE Symposium on Security and Privacy, San Francisco, CA, 2012, pp. 553-567. (Year: 2012).*

Waugh, R., "No wonder hackers have it easy: Most of us now have 26 different online accounts—but only five passwords," Jul. 16, 2012, 2pgs. http://www.dailymail.co.uk/sciencetech/article-2174274/No-wonder-hackers-easy.

Perlroth, N., and Gelles, D., "Russian Hackers Amass Over a Billion Internet Passwords," Aug. 5, 2014, 5pgs. http://www.nytimes.com/2014/08/06/technology/russian.

McAfee, Inc., "Net Losses: Estimating the Global Cost of Cybercrime: Economic Impact of Cybercrime II," Center for Strategic and International Studies, Jun. 2014, 24 pgs. http://www.mcafee.com/us/resources/reports/rp-economic.

Maor, E., "How to Bypass Two-Factor Authentication (2FA) and What the Future Holds," Sep. 30, 2014, 5pgs. http://securityintelligence.com/how-to-bypass-two-factor-authentication-2fa.

Bonneau, J. et al., "The Quest to Replace Passwords: A Framework for Comparative Evaluation of Web Authentication Schemes," 2012 IEEE Symposium on Security and Privacy, San Francisco, CA, 2012, pp. 553-567.

Ahn, G.J., et al., "Managing Privacy Preferences for Federated Identity Management," Proceedings of the 2005 Workshop on Digital Identity Management, ACM, 2005, pp. 28-36.

Altmann, J., et al., "UNIQuE: A User-Centric Framework for Network Identity Management," 2006 IEEE/IFIP Network Operations and Management Symposium NOMS 2006, Vancouver, BC, 2006, pp. 495-506.

* cited by examiner

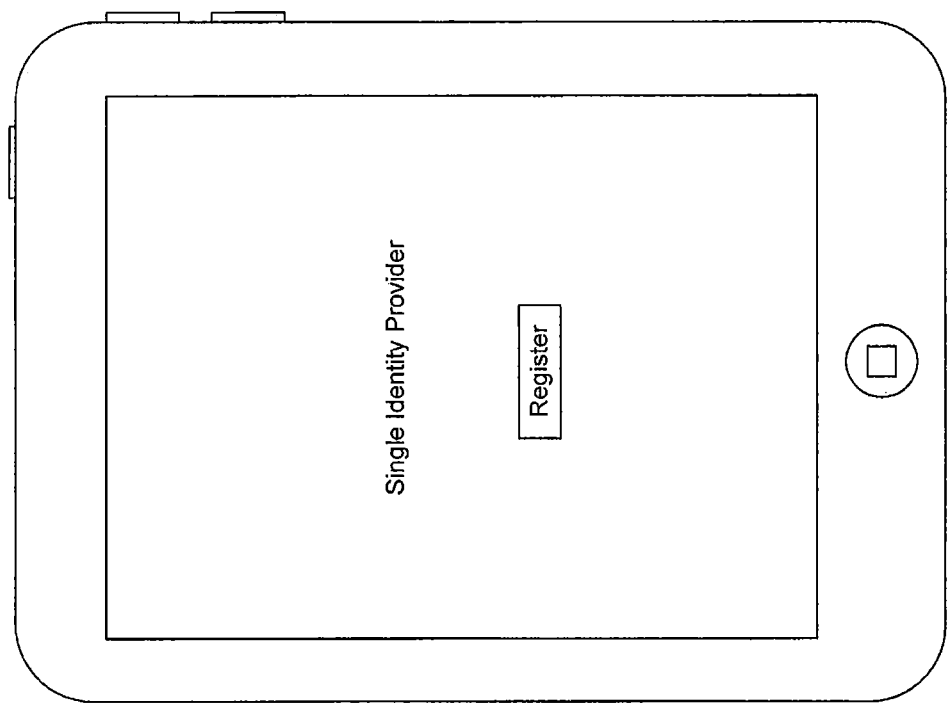

COMPUTER-IMPLEMENTED SYSTEMS AND METHODS OF DEVICE BASED, INTERNET-CENTRIC, AUTHENTICATION

CROSS-REFERENCE TO RELATED APPLICATIONS

This application claims priority to U.S. Provisional Patent Application Ser. No. 62/076,637, filed on Nov. 7, 2014 and U.S. patent application Ser. No. 14/858,087, filed on Sep. 18, 2015, the entirety of which are herein incorporated by reference.

FIELD

The present disclosure is directed generally to Internet services provided by relying parties and more particularly to computer implemented systems and methods of authorizing respective access by each of a plurality of Internet users to a respective one or more Internet services provided by each of a plurality of relying parties.

DESCRIPTION OF THE RELATED ART

Ubiquitous, single factor, username and password schemes for Internet-centric (e.g. web-based) authentication are notably vulnerable to security breaches via illicit knowledge token (password) interception in network communications sent over encrypted (e.g. HTTPS), or unencrypted (e.g. HTTP), communications protocols (e.g. via multi-session attacks, timing attacks, side channel attacks, dictionary attacks, etc.), duplicitous password recovery (e.g. via phishing attacks), or programmatic hacking of network-accessible password databases, by cybercriminals.

For example, according to a recent study, the average Internet user had over twenty-five (25) Internet-accessible user accounts, but only five (5) distinct passwords used across all such accounts. See Waugh, Rob, "No wonder hackers have it easy: Most of us now have 26 different online accounts—but only five passwords," Jul. 16, 2012, accessible at <http://www.dailymail.co.uk/sciencetech/article-2174274/No-wonder-hackers-easy-Most-26-different-online-accounts-passwords.html#ixzz3hxCnv6YG>. Additionally, in 2014, 1.2 billion passwords were stolen from network-accessible password databases by a single multi-Internet site attack by cybercriminals. See Perlroth, N. and Gelles, D., "Russian Hackers Amass Over a Billion Internet Passwords," Aug. 5, 2014, accessible at: <http://www.nytimes.com/2014/08/06/technology/russian-gang-said-to-amass-more-than-a-billion-stolen-internet-credentials.html?hp&action=click&pgtype=Homepage&version=LedeSum&module=first-column-region&region=top-news&WT.nav=top-news&_r=0>. This combination of password re-use, and compromised user data, creates significant security vulnerability for consumers and commercial interests that rely on conventional single factor, username and password schemes for Internet-centric authentication. Moreover, the annual global cost to such consumers and commercial interests from cybercrime is estimated to be between \$375 billion and \$500 billion. See "Net Losses: Estimating the Global Cost of Cybercrime, McAfee, Inc., 2014, accessible at: <http://www.mcafee.com/us/resources/reports/rp-economic-impact-cybercrime2.pd.

Multi-factor authentication is a widely accepted protocol to protect Internet-accessible user accounts from being compromised by cyber-criminals. However, existing Internet-centric, multi-factor, authentication schemes have had limited adoption due to cost, enrollment and issuance complexity, and lack of user convenience. Thus, outside of mandated environments, multi-factor, Internet-centric, authentication schemes have realized little adoption.

Using temporary one-time passwords in Internet-centric authentication schemes, whether hardware or software based, also suffer from complicated identity registration schemes and a host of technical adoption challenges. A number of such schemes also have security vulnerabilities that allow cyber criminals to intercept short messaging service (SMS), or application-based (e.g. web application, native application, mobile application), one-time passwords.

For example, conventional Internet-centric authentication schemes using hardware-based tokens, require the creation, sending, receipt, and use of a hardware token in its entirety and that is typically bound to a single Internet service provider or relying party. Such conventional, hardware-based, Internet-centric, authentication schemes also commonly require a third-party to configure such hardware tokens, in a time-intensive, administrator-controlled, process, prior to sending each token to an Internet user. If an Internet user wanted to use a hardware-based, Internet-centric, multi-factor, authentication scheme to access twenty (20) services over the Internet, or if the respective relying party of each of such twenty (20) services required the use of a hardware-based, Internet-centric, multi-factor, authentication scheme to access their respective service over the Internet, an Internet user would be required to order, receive, distinguish, and use, as many as twenty (20) hardware tokens. Moreover, such conventional, hardware-based, Internet-centric, authentication schemes, are subject to security vulnerabilities outside of the Internet environment including, for example, mail interception, and physical theft, of such hardware tokens.

Additionally, for example, conventional Internet-centric authentication schemes using software-based one-time password protocols, require a distinct software-based (e.g. virtual) token to access Internet-based services of each relying party, and typically require a time-intensive, complicated, binding process to associate each software-based token with each respective relying party. Moreover, SMS, and software based, one-time passwords have been proven to be vulnerable to social engineering and HTML injection attacks by cyber-criminals. See Maor, Etay, "How to Bypass Two-Factor Authentication (2FA) and What the Future Holds," Sep. 30, 2014, accessible at: <http://securityintelligence-.com/how-to-bypass-two-factor-authentication-2fa-and-what-the-future-holds/#.VcDT4JNVhBc>.

What is needed are cost-effective, secure, computer-implemented systems and methods to resolve these technical challenges and vulnerabilities unique to, and specifically arising in, Internet-centric authentication of Internet users accessing relying party services over the Internet.

SUMMARY

In various embodiments of the present disclosure, computer-implemented methods and systems for Internet-centric authentication of a user to an Internet service provider service, are provided. In some embodiments, a system for authorizing respective access by each of a plurality of Internet users to a respective one or more Internet services provided by each of a plurality of Internet service providers includes a processor at a single identity provider, a first non-transient computer readable storage medium of the single identity provider where the first non-transient computer readable storage medium is configured to store data, and a second non-transient machine-readable storage medium of the single identity provider where the second non-transient computer readable storage medium is encoded with program code executable by the processor. The stored data includes, for each of a plurality of Internet users, a respective public key portion of a respective authentication token that is specific to an electronic mail address, or anonymous identifier, of the Internet user, a user credential of the Internet user, a device identifier for each of one or more devices, and an identity provider application residing on a mobile device of the one or more devices and that is usable by the Internet user to access a respective one or more Internet services provided by each of a plurality of Internet service providers. The stored data includes, for each of the plurality of Internet service providers, a respective identifier that is visually perceptible when displayed on a page of the identity provider application and when displayed on a web page belonging to the Internet service provider. The stored data also includes, for each of a respective one or more Internet services provided by each of the plurality of Internet service providers, a respective identifier, and a respective one or more call-back Internet addresses. The program code executable by the processor is for requiring the respective identity provider application residing on each of the respective mobile devices to create the respective authentication token and to store a respective private key portion of the respective authentication token on the respective mobile device, and receiving, via a respective application programming interface (API) call from a respective computer server of each of the plurality of Internet service providers, a respective identifier for a respective requested one of the respective one or more Internet services provided by the respective Internet service provider where each respective identifier is received in response to a respective Internet user selection of a respective link on the respective web page belonging to the respective Internet service provider and displayed on a respective web browser to request access to the respective requested one Internet service. The program code executable by the processor is also for automatically generating, and transmitting to the respective web browser, a respective web page that displays the respective visually perceptible identifier of the respective Internet service provider and a respective Internet address of the respective web page belonging to the respective Internet service provider, and requiring the respective identity provider application residing on each of the respective mobile devices to display a respective page to input the respective user credential of the respective Internet user, wherein each input user credential is usable to decrypt the respective stored private key portion of the respective authentication token. The program code executable by the processor is also for receiving, via a respective API call from the respective identity provider application residing on each of the respective mobile devices, a respective approved authentication challenge message, validating each of a plurality of the received respective approved authentication challenge messages using the respective stored public key portion of the respective authentication token, and in response to validating the plurality of received approved authentication challenge messages, authorizing access by the respective Internet user to the respective requested one Internet service by re-directing the respective web browser to a respective one of the respective one or more call-back Internet addresses for the respective requested one Internet service.

In some embodiments of the present disclosure, a system for authorizing respective access by each of a plurality of Internet users to a respective one or more Internet services provided by each of a plurality of Internet service providers includes a processor at a single identity provider, a first non-transient computer readable storage medium of the single identity provider, where the first non-transient computer readable storage medium is configured to store data, and a second non-transient machine-readable storage medium of the single identity provider, where the second non-transient computer readable storage medium is encoded with program code executable by the processor. The stored data includes, for each of a plurality of Internet users, a respective public key portion of a respective authentication token that is specific to an identifier of the Internet user, a user credential of the Internet user, a device identifier for each of one or more devices, an identity provider application residing on a mobile device of the one or more devices and that is usable by the Internet user to access a respective one or more Internet services provided by each of a plurality of Internet service providers, and a pseudorandom activation code. The stored data also includes, for each of a respective one or more Internet services provided by each of the plurality of Internet service providers, a respective identifier, and a respective one or more call-back Internet addresses. The program code executable by the processor is for requiring the respective identity provider application residing on each of the respective mobile devices to create the respective authentication token and to store a respective private key portion of the respective created authentication token on the respective mobile device, generating respective pseudorandom activation codes to activate the respective created authentication tokens, where each generated pseudorandom activation code is usable to activate a respective one of the created authentication tokens, and generating respective pages to activate the respective created authentication tokens, where each generated page displays a respective active link associated with the respective generated pseudorandom activation code. The program code executable by the processor is also for transmitting, in a first out-of-band interaction with a respective application, other than the identity provider application and residing on each of the respective mobile devices, the respective generated page, activating, in a second out-of-band interaction with a respective web browser on each of the respective mobile devices, the respective one of the created authentication tokens, in response to a respective Internet user selection of the respective active link displayed by the respective application other than the identity provider application and residing on the respective mobile device, and authorizing respective access by two or more of the plurality of Internet users to a respective requested one of the respective one or more Internet services provided by each of two or more of the plurality of Internet service providers using the respective activated authentication token, the respective identifier for the respective requested one of the respective one or more Internet services provided by each of the two or more of the plurality of Internet service providers, and the respective one or more call-back Internet addresses for the respective requested one of the respective one or more Internet services provided by each of the two or more of the plurality of Internet service providers.

In some embodiments of the present disclosure, a non-transient computer readable storage medium encoded with program code is provided, where the program code is configured such that, when executed by a processor of a device, the processor performs a method of authorizing access by an Internet user to a respective one or more Internet services provided by each of a plurality of Internet service providers, and where the method includes an identity provider application residing on the device creating an authentication token comprising a public key portion and a private key portion, encrypting the private key portion using the user credential of the Internet user, storing the encrypted private key portion in a memory of the device, and transmitting, via an application programming interface (API) call to a computer server of a single identity provider, the public key portion of the created authentication token. The created authentication token is specific to an electronic mail address, or anonymous identifier, of an Internet user, a user credential of the Internet user, a device identifier for each of one or more devices including the device, and the identity provider application. The method also includes a web browser of the device displaying one or more of a plurality of web pages, where each web page belongs to a respective Internet service provider, and where each respective web page includes a respective link usable to request access by the Internet user to a respective one of the respective one or more Internet services provided by the respective Internet service provider. The method also includes the web browser receiving a respective selection of the respective link on each of the displayed one or more web pages and, in response to receiving each respective selection of the respective link on the displayed one or more web pages, and the web browser transmitting, to a web server of the Internet service provider, a respective electronic signal including content indicative of a respective identifier for the respective one of the respective one or more Internet services provided by the respective Internet service provider, displaying content of a respective first web page belonging to the single identity service provider at a respective first Internet address of the single identity service provider in response to receiving a respective API call from the web server of the single identity service provider, transmitting, to a web server of the single identity provider, a respective electronic signal including content indicative of an electronic mail address, or an anonymous identifier, of the Internet user, and displaying content of a respective second web page belonging to the single identity service provider at a respective second Internet address of the single identity service provider in response to receiving a respective API call from the web server of the single identity service provider, where the content of the second web page includes a respective visually perceptible identifier of the respective Internet service provider, the electronic mail address, or the anonymous identifier, of the Internet user, and a respective Internet address of the respective web page belonging to the respective Internet service provider. The method includes the processor of the device automatically initiating the identity provider application residing on the device and, in response to receiving a respective API call from the computer server of the single identity provider, the identity provider application validating a respective user credential received from a respective page displayed by the identity provider application by decrypting the stored encrypted private key portion of the authentication token, generating a respective approved authentication challenge message by digitally signing a predefined pseudorandom string with the decrypted private key portion of the authentication token and transmitting, via an API call to the computer server of the single identity provider, the generated respective approved authentication challenge message, and the web browser re-directing to a respective call-back Internet address of, and displaying content of, another respective web page belonging to the respective Internet service provider where the another respective web page is usable by the Internet user to access the respective requested one of the respective one or more Internet services provided by the respective Internet service provider.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

FIGS. 6A-6E are illustrative screenshots of examples of Internet user interfaces to an identity provider application residing on a device, to an application other than the identity provider application residing on the device, and to single identity provider Internet services.

DETAILED DESCRIPTION OF THE EXAMPLES

Figure 1:
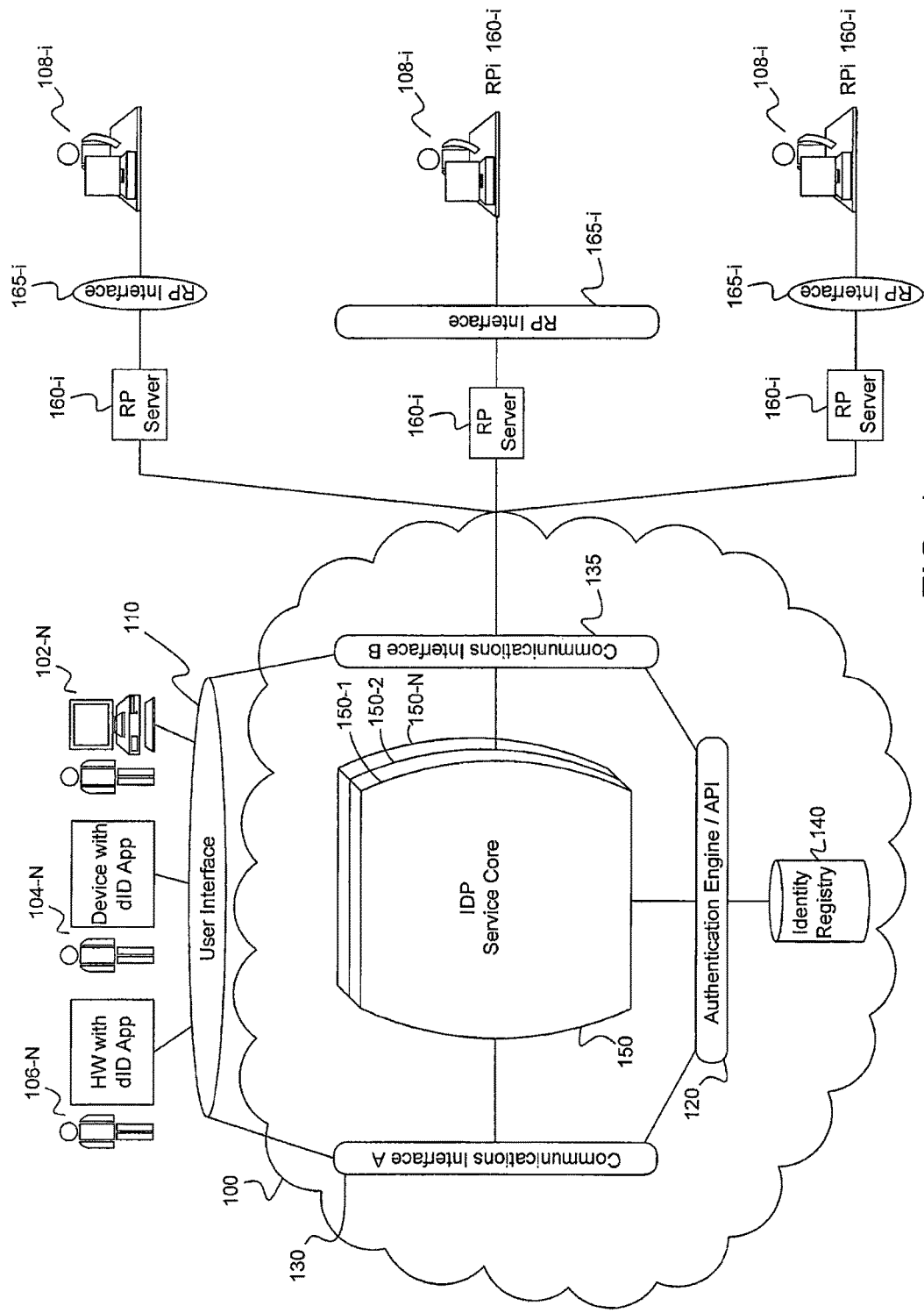
FIG. 1 is a block diagram of an example of an Internet-accessible cloud service platform of a single identity provider in accordance with some embodiments of the present disclosure.

With reference to the Figures, where like elements have been given like numerical designations to facilitate an understanding of the drawings, the various embodiments of a computer-implemented system and method of authorizing respective access by each of a plurality of Internet users to a respective one or more Internet services provided by each of a plurality of Internet service providers are described. The figures are not drawn to scale.

The computer-implemented systems and methods described herein, with their uniquely secure, cost-effective, and device-based schemes, provide a technical solution to resolve the security vulnerabilities and technical adoption challenges arising specifically in existing Internet-centric (e.g. web-based) authentication processes. In various embodiments, Internet users can utilize a respective identity provider application of a single identity provider residing on a respective device that is configured with an authentication token and an user credential of the Internet user, where the authentication token is specific to an user identifier of the Internet user, the user credential of the Internet user, a device identifier for one or more devices including the device, and the identity provider application. In various embodiments, Internet users can utilize the identity provider application, and services provided by the single identity provider, to authenticate to an unlimited number of participating Internet services of an unlimited number of Internet service providers. In various embodiments, the Internet users, single identity provider, and relying parties, utilize an authentication scheme necessarily rooted in respective identity provider applications residing on respective Internet user devices, a secure asymmetric cryptography technique, a rotating encryption key technique, multi-channel Internet communication protocols to protect data both in rest (e.g. stored in memory of respective Internet user devices, in memory of a server of the single identity provider, in memory of respective servers of the relying parties, etc.) and in transit (communication over multi-channel Internet communication protocols). In various embodiments, relying parties/Internet service providers can implement open standards-based Open ID Connect authentication protocols to enable authorization of Internet users' access to Internet services provided by the relying parties/Internet service providers via the single identity provider service. The computer-implemented systems and methods described herein create a seamless and secure framework for authorizing respective access by each of a plurality of Internet users to Internet services provided by each of a plurality of Internet service providers that provides a technical solution to transform Internet-centric (e.g. online) authentication from a vulnerable, risk-realized scheme to a seamless and secure framework for Internet-centric interaction and provision of Internet services.

Various embodiments resolve the foregoing technical challenges and vulnerabilities unique to prior art single factor, and multifactor, Internet-centric authentication schemes and provide computer-implemented systems and methods to facilitate secure and seamless Internet-centric, device-based, authentication of Internet users to Internet-based relying party systems. For example, Internet users may benefit from being able to use a device-based application of a single identity provider to securely and seamlessly authenticate themselves to the single identity provider and relying parties over the Internet, and to securely and seamlessly be granted authorized access to Internet services provided by such relying parties, from any possible network access point, including without limitation, a browser on a laptop computer, an application on a separate device (e.g. mobile device), and/or a service running on the same device (e.g. mobile device). Internet users and Internet-accessible relying parties may both benefit from being able to seamlessly use cryptographic techniques with a single identity provider which resolve vulnerabilities of prior art Internet-centric authentication schemes and yet reduce technical implementation complexity. Internet-accessible relying parties may also benefit from streamlined adoption achieved by leveraging Open ID Connect protocols.

The following description is provided as an enabling teaching of a representative set of examples. Many changes can be made to the embodiments described herein while still obtaining beneficial results. Some of the desired benefits discussed below can be obtained by selecting some of the features or steps discussed herein without utilizing other features or steps. Accordingly, many modifications and adaptations, as well as subsets of the features and steps described herein are possible and can even be desirable in certain circumstances. Thus, the following description is provided as illustrative and is not limiting.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical,", "above," "below," "up," "down," "top" and "bottom" as well as derivative thereof (e.g., "horizontally", "downwardly", "upwardly", etc.) should be construed to refer to the orientation as then described or as shown in the drawing under discussion. These relative terms are for convenience of description only and do not require that a system or apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. The term "adjacent" as used herein to describe the relationship between structures/components includes both direct contact between the respective structures/components referenced and the presence of other intervening structures/components between respective structures/components.

As used herein, use of a singular article such as "a," "an" and "the" is not intended to exclude pluralities of the article's object unless the context clearly and unambiguously dictates otherwise.

The inventors have developed computer-implemented systems and methods of authorizing respective access by each of a plurality of Internet users to a respective one or more Internet services provided by each of a plurality of Internet service providers that provides Internet users and Internet-accessible relying parties with decentralized, secure, seamless, authentication capabilities to improve revenue, decrease costs, resolve vulnerabilities and technical implementation challenges, and achieve enhanced security Internet-centric authentication processes previously unrealized by existing schemes. For example, the inventors have determined that various embodiments of the computer-implemented systems and methods provided herein may combine decentralized authentication protocols, cryptographic authentication algorithms, and core capabilities of Internet-capable devices (e.g. mobile devices) to form a unique, secure, seamless, digital identity and authentication scheme. Various embodiments include a mobile application designed to run on mobile operating systems, a cloud-based identity provider service of a single identity provider, and cooperating relying parties that provide Internet services, communicating over a network such as the Internet.

The inventors have also determined that various embodiments of the computer-implemented systems and methods provided herein can protect an Internet user's account access over the Internet to relying parties' Internet services by multi-factor authentication including binding an authentication token created by an identity provider application residing on a device to an identifier of the Internet user, an identifier of one or more of his/her Internet-capable devices, the Internet user's knowledge or possession of a user credential of the Internet user (e.g. a PIN and/or a biometric factor), and to the identity provider application. By way of example, the inventors have also observed that various embodiments of the systems and methods described herein can provide enhanced security to a user's account access over the Internet to relying parties' Internet services, and a user's identity assertion over the Internet, by requiring one or more user credentials (e.g. PIN and/or a biometric factor) before successful Internet-centric authentication to relying party Internet services. In various embodiments, a pseudo-random string received by an identity provider application residing on a device from the single identity provider, and a user credential retrieved by the identity provider application in real-time, are processed and utilized by the identity provider application to decrypt a selected stored portion (e.g. private key portion) of an authentication token, enables multi-factor Internet-centric authentication to relying party Internet services. In various embodiments, and from an Internet user's perspective, the user's submission of relying party Internet services' identifiers to a single identity provider by selection of a link on the relying parties' websites, submission of his/her identifier (e.g. email address or anonymous identifier) via an application programming interface call from an identity provider application to a single identity provider over the Internet, click (or press, or otherwise activate) a hypertext (or hot spots, such as buttons, or an image) "submit" or the like on a page of an application other than the identity provider application in an out-of-band interaction, display of an alert communicated over the Internet to his/her device (e.g. his/her mobile device), the submission of his/her user credential to be validated by the identity provider application, upon successful user credential validation, generation and transmission of an approved authentication challenge message via an application programming interface call from the identity provider application to the single identity provider over the Internet, and, upon successful approved authentication challenge message validation, provides a user-friendly Internet-centric authentication process to authorize access by Internet users to Internet services provided by each of a plurality of relying parties/Internet service providers.

Various embodiments of the present disclosure provide multifactor device based authentication capabilities with an identity provider (IDP) service of a single IDP, computer code deployed and executed on a processor of a server of the single IDP, a device identity provider application (dID app or dID application such as, for example, a PrivaKey™ device identity and authentication application), and computer code deployed and executed on respective processors of respective servers of cooperating Relying Party's (RP) Internet services. In various embodiments, a single IDP service, dID app(s), and RP Internet service(s) and associated computer code, operate in concert to ensure that the digital identity authenticating to one or more RP Internet services belongs to the individual who initially registered the identity with the single IDP service and that the one or more RP Internet services are registered with the single IDP service. For example, the inventors have observed that in using various embodiments of the systems and methods described herein, an Internet user can authenticate to a plurality of Internet (e.g. online) RP Internet services over the Internet from any access point by initiating requests over the Internet for access to the plurality of (RP) Internet services that are pre-registered with a single identity provider (IDP) service such that the requested RP Internet services are identifiable to the single IDP service via Open ID Connect protocol communications, and asserting his/her identity over the Internet to the single IDP service to initiate a device identity provider application (dID app) (such as for example, a PrivaKey™ device identity and authentication application) residing on a registered device of the Internet user. In various embodiments, the Internet user can confirm the requests for access using the dID app residing on a registered device of the Internet user, and the dID app can then access the Internet user's encrypted, cryptographic private key portion of the Internet user's authentication token via one or more additional factors (e.g., one or more user credentials (e.g. Internet user's PIN, one or more Internet user biometric factors, and/or combinations thereof). In various embodiments, in systems and methods provided herein, the dID app can use an Internet user's decrypted, cryptographic private key portion of the Internet user's authentication token to digitally sign an approved authentication challenge response (e.g. a string of data pre-defined between the Internet user and the single IDP) transmitted to the single IDP service over the Internet using an API call, and where the single IDP service can validate the transmitted approved authentication challenge response using a cryptographic public key portion of the Internet user's authentication token. In some embodiments, after the single IDP validates the transmitted approved authentication challenge response, the single IDP service can re-direct a web browser of the Internet user to an RP Internet service Internet address that is pre-registered with the single IDP (e.g. a call-back Internet address of the RP Internet service) to authorize the Internet user's access to the requested RP Internet service with a validation token (e.g. an Internet service identifier, an Internet service secret, and/or combinations thereof), and the RP providing the RP Internet service can then confirm the authenticity of the validation token with the single IDP service via Open ID Connect protocol communications.

In various embodiments, the systems and methods provided herein include the single IDP service deployed as a cloud network service allowing various (e.g. multiple, independent) cooperative relying parties (RP) to leverage the single IDP service and dID app Internet user environment. In various embodiments, independent relying parties (RPs) are connected over a communications network to the single IDP service core (e.g. over the Internet (e.g. web pages) and over Open ID Connect protocol communications) and their respective RP Internet services, Internet users are connected over the Internet to the independent RP Internet services, Internet users are connected to the single IDP service using the dID app residing on a respective device of each Internet user and over the Internet using a respective web browser residing on a respective device of each Internet user. In some embodiments, the systems and methods provided herein are deployed as a dedicated service in which a plurality of dID apps, the single IDP service, and one or more RP Internet services of a plurality of RPs, are bound and dedicated to each other over a communications network.

Various embodiments of the present disclosure provide a cloud computing Internet-centric environment 100 as shown in FIG. 1 that includes multiple blocks of hardware, referred to as identity provider service cores (denoted IDP service cores 150-1, 150-2, . . . , 150-N; these may be referred to collectively as "IDP service cores 150") of a single IDP, and various modules operating in a cloud computing Internet-centric environment 100 including an Internet user interface 110, an authentication engine 120 that provides authentication services to various RPs and various Internet users. Although three IDP service cores of the single IDP are shown in this example, any number of IDP service cores of the single IDP may be used. Respective operational personnel 108-*i* (e.g., system administrators or other personnel) of each RP Internet service provider 160-*i* providing one or more RP Internet services may access the IDP services core 150 via a respective RP server 160-*i* to register their respective RP interface 165-*i*. Although three RP interfaces 165-*i* for three RP Internet service providers 160-*i*, and a single Internet user-interface 110, are shown in this example, the environment 100 can support any number of RP Internet service providers (160-*i*) and any number of Internet users N. In various embodiments, operational personnel (not shown) (e.g., system administrators or other personnel of a single IDP service) may access the authentication engine 120 (referred to as authentication engine 120 for convenience). In various embodiments, operational personnel of an IDP service of the single IDP (not shown) can access other modules or repositories (e.g. identity repository 140, etc.).

In various embodiments, the authentication engine 120 interfaces with each respective Internet user interface module 110, identity provider service core 150, identity repository 140, and each respective RP interface module 165-*i*. In various embodiments, authentication engine 120 stores cryptographic rules, binding rules, information authentication rules, as discussed herein for each particular Internet user N, for each particular RP 160-*i*, for particular Internet services provided by each particular RP 160-*i*, and/or by or for the single identity provider service in a storage unit (e.g. NoSQL, MySQL cluster, database). In various embodiments, authentication engine 120 stores such rules in a storage unit running on a database service (e.g. Relation Database Service). In some embodiments, authentication engine 120 can store such rules in a non-transitory, tangible machine readable storage medium. The non-transitory, tangible storage medium can be a non-transitory computer readable medium. The computer readable medium can be a machine-readable storage device, a machine-readable storage medium, a memory device (e.g., flash or random access memory), a hard disk drive, a tape drive, an optical drive (such as, but not limited to CDROM, DVD, or BDROM) or the like, or a combination of one or more of them. In various embodiments, authentication engine 120 is an integrated module of identity provider service core 150.

Figure 3:
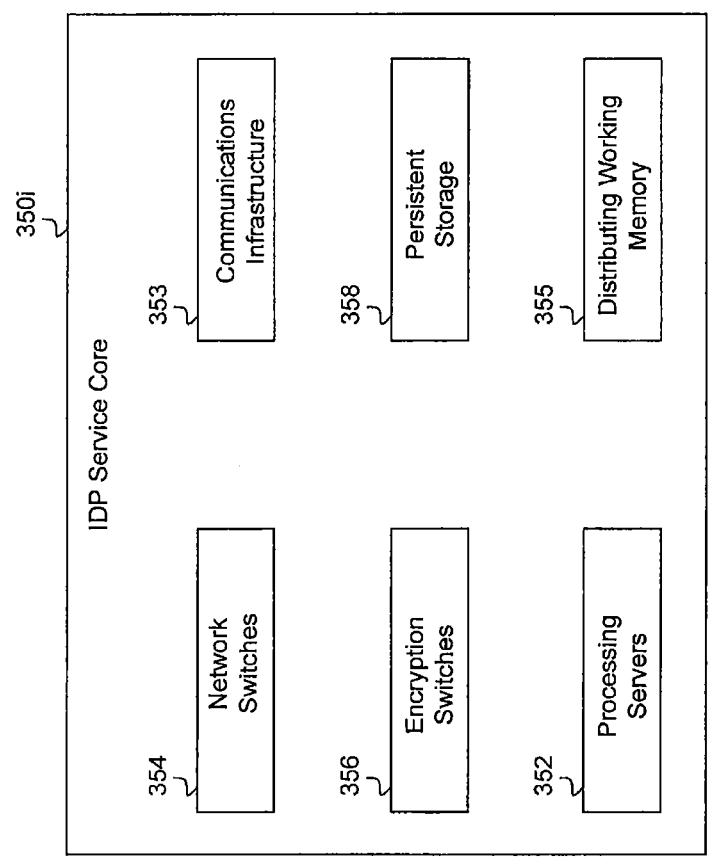
FIG. 3 is a diagram of an example of a service core for an Internet-accessible cloud of a single identity provider in a cloud computing environment in accordance with some embodiments.

FIG. 3 shows an example of an IDP service core 350-N of the single IDP that includes one or more servers 352 (e.g., Linux, Windows, blade servers), distributed working memory 355 (e.g. IMDB, MMDB, memory resident database, etc.), and one or more network switches, including network switch 354 and/or encryption switch 356. In various embodiments, IDP service core 350 software of the single IDP is installed on a Windows, Linux, or similar server in a secure data center. In various embodiments, IDP service core 350-N includes a persistent storage unit 358 (e.g. NoSQL, MySQL cluster, database). In various embodiments, persistent storage unit 358 is configured to run on a database service (e.g. Relation Database Service). In various embodiments, distributed working memory 355 is software running on server 352 and includes a plurality of in-memory data grids (e.g. IMDB, MMDB, memory resident, data grids), server 352 is a blade server running the distributed working memory software and communicating with each respective user interface 110-N via an object-oriented data interchange format such as JavaScript Object Notation (JSON) and providing, for example, NoSQL, or MySQL cluster, persistence. For example, IDP service core 350-N may be hosted on a web services cloud computing infrastructure and include a Domain Name Server (DNS) (e.g. Route 53 DNS) (not shown), an Elastic Load Balancer (ELB) (not shown) to distribute traffic across servers 352, Elastic Compute Cloud (EC2) (not shown) instances to host IDP service core 350-N, and an electronic mail service for electronic mail delivery. In various embodiments, DNS server (not shown) is configured to route Internet web traffic (e.g. HTTP, HTTPS) to a registered domain of the single IDP or registered domains of respective Internet services of respective registered RPs, to servers 352 or ELB (not shown). In various embodiments, ELB (not shown) is configured to distribute received traffic to a selected IDP domain for IDP service core 150 running, for example, within Internet Information Services on Windows 2012 servers hosted on one or more EC2 servers. In various embodiments, cloud computing Internet centric environment 100 includes a traffic filtering module that is configured to only allow HTTP and HTTPS protocols to access the EC2 server. In various embodiments, distributed working memory 355 can provide scalability, distribution and/or resiliency to the architecture of IDP service core 350-N of the single IDP. In various embodiments, IDP service core 350-N of the single IDP includes a plurality of distributed nodes built on top of distributed working memory 355 using distributed working memory software.

In various embodiments, IDP service core 350-N of the single IDP includes suitable database software running in conjunction with IDP software of the single IDP, such as, for example with identity repository 140. In various embodiments, identity repository 140 is an identity store and stores registration information of single IDP registered Internet users and/or single IDP registered Internet user devices such as, for example, Internet user names, electronic mail addresses, public key portions of dID app created authentication tokens, anonymous identifiers, device identifiers of one or more Internet user devices, etc. In various embodiments, identity repository 140 stores registration information of single IDP registered relying parties and single IDP registered Internet services provided by such single IDP registered relying parties such as, for example, relying party identifiers (e.g. relying party name, relying party image, relying party logo) that are visually perceptible when displayed on a page of the dID app and/or when displayed on a web page belonging to the relying party, Internet service identifiers (e.g. pseudorandom string uniquely generated for each Internet service), one or more respective call-back Internet addresses for each Internet service, one or more respective call-back Internet addresses for each relying party, respective base Internet addresses for each Internet service, respective base Internet addresses for each relying party, and/or Internet service secrets. It is understood that to be cryptographically secure, a pseudorandom sequence must be unpredictable where a secret key, or seed, is used to set the initial state of the pseudorandom sequence generator, and where a pseudorandom sequence generator produces a pseudorandom sequence with a period that is long enough so that a finite sequence of reasonable length is not periodic. In various embodiments, a base Internet address may be a base Uniform Resource Locator (URL) for a particular Internet service for a particular relying party. In some embodiments, a base Internet address may be a base Uniform Resource Locator (URL) for a particular relying party. In various embodiments, a base Internet address does not include http or any subdomain. In various embodiments, a call-back Internet address may be a re-direct URL that determines where the single IDP re-directs a web browser of an Internet user requesting access to a particular Internet service of a particular relying party over the Internet in response to the single IDP's validation of an associated approved authentication challenge message. In various embodiments, a call-back Internet address is a fully qualified URL such as, for example, a URL including https and a subdomain (e.g. "www" (world wide web)). In various embodiments, identity repository 140 can be deployed on a server in a secure data center of the single IDP.

Referring again to FIG. 1, the Internet user interface module 110 provides an interface between Internet user devices 102-N, 104-N, 106-N of a plurality of Internet users and the cloud 100 (e.g. a public cloud). The Internet user in this context may refer to a customer N of the cloud (e.g. employee, government agency, agent, analyst, etc.) provided by an IDP service core 150-N of the single IDP, or an individual N at a customer site with a network connection to the cloud 100, and that is requesting authorization to access one or more Internet services provided by one or more relying parties 160-i. In various embodiments, the user interface 110 is a representational state transfer (REST) application programming interface (API) based on a JSON model to provide access to many types of clients (e.g. thick and thin clients, human wearable (HW) device 106 clients, mobile device 104 clients, etc.) over the Internet. In various embodiments, user interface module 110 provides a Web-based interface (e.g. via a web-based application) to provide access over the Internet to many types of clients (e.g. HW device 106 clients, mobile device 104 clients, desktop 102 clients, etc.). In various embodiments, user interface 110 provides platform/device independent visualization. In various embodiments, devices (e.g. 102, 104, 106) can include any suitable device such as, for example, a microprocessor-based computer terminal, a mobile device, a kiosk, a personal digital assistant, a cellular phone, a tablet, an electronic personal planner, a slate tablet, a booklet computer, a convertible notebook, a phablet, a smart phone, a human-wearable computing device, a networked microprocessor-based computer in an automobile, etc. In various embodiments, user interface 110 provides portal-based network services to many types of clients (102, 106, 104). In various embodiments, user interface module 110 includes web services. In various embodiments, user interface module 110 provides a command driven interface (e.g. DOS, Linux, etc. command driven interface). The user interface module 110 can include a networked portal, including a separate portal for each N customer of IDP service core 150-N of the single IDP.

Cloud computing Internet-centric environment 100 can also include respective communications interface modules A 130 and B 135 communicating with IDP service core 150-N of the single IDP, authentication engine 120 of the single IDP, user interface 110 for each of a plurality of Internet users, and/or RP interface 165-i for each of a plurality of RPs and to a respective one or more Internet services provided by each of the plurality of RPs. Communications interface modules A 130 and B 135 allow software and data to be transferred between service core 150-N of the single IDP, authentication engine 120 of the single IDP, RP Internet services of each of the RPs 160-i, and/or Internet user devices (102, 104, 106) over the Internet. Examples of communications interface modules A 130 and B 135 can include a modem, Ethernet card, wireless network card, a Personal Computer Memory Card International Association (PCMCIA) slot and card, or the like. Software and data transferred via communications interface modules A 130 and B 135 can be in the form of signals, which can be electronic, electromagnetic, optical, or the like that are capable of being received by communications interface modules A 130 and B 135. These signals can be provided to communications interface modules A 130 and B 135 via a communications path (e.g., channel), which can be implemented using wire, cable, fiber optics, a telephone line, a cellular link, a radio frequency (RF) link and other communication channels. These signals can be provided to communications interface modules A 130 and B 135 via Open ID Connect protocols.

The Identity Provider Service of the Single Identity Provider

In various embodiments, Identity Provider (IDP) service 150 of the single Identity Provider serves as an authentication broker between a plurality of Relying Parties (RP) 160-i and respective Internet user devices for a plurality of Internet users requesting respective access to respective Internet services provided by each of the plurality of RPs 160-i, as a repository of Internet user identities, Internet user device identities, RP identities, and/or Internet service identities for Internet services provided by RPs, and as a management interface for Internet users, their devices, and RPs.

In various embodiments, to broker authentication requests, IDP service core 150 of the single IDP uses Open ID Connect protocols while interacting with respective one or more RP Internet services of each of a plurality of RPs 160-i over a communications network, and cryptographic validation when interacting with dID app (FIG. 1) residing on Internet user devices over a communications network, other applications operating on Internet user devices over a communications network, web browsers operating on Internet user devices over a communications network, via authentication engine 120 and respective communications interface modules A 130, B 135. In various embodiments, as discussed herein, the IDP service core 150 of the single IDP can leverage Internet user device operating system notification frameworks such as Google's Android, Apple's iOS, Windows, Blackberry OS, and MAC OS.

Figure 7:
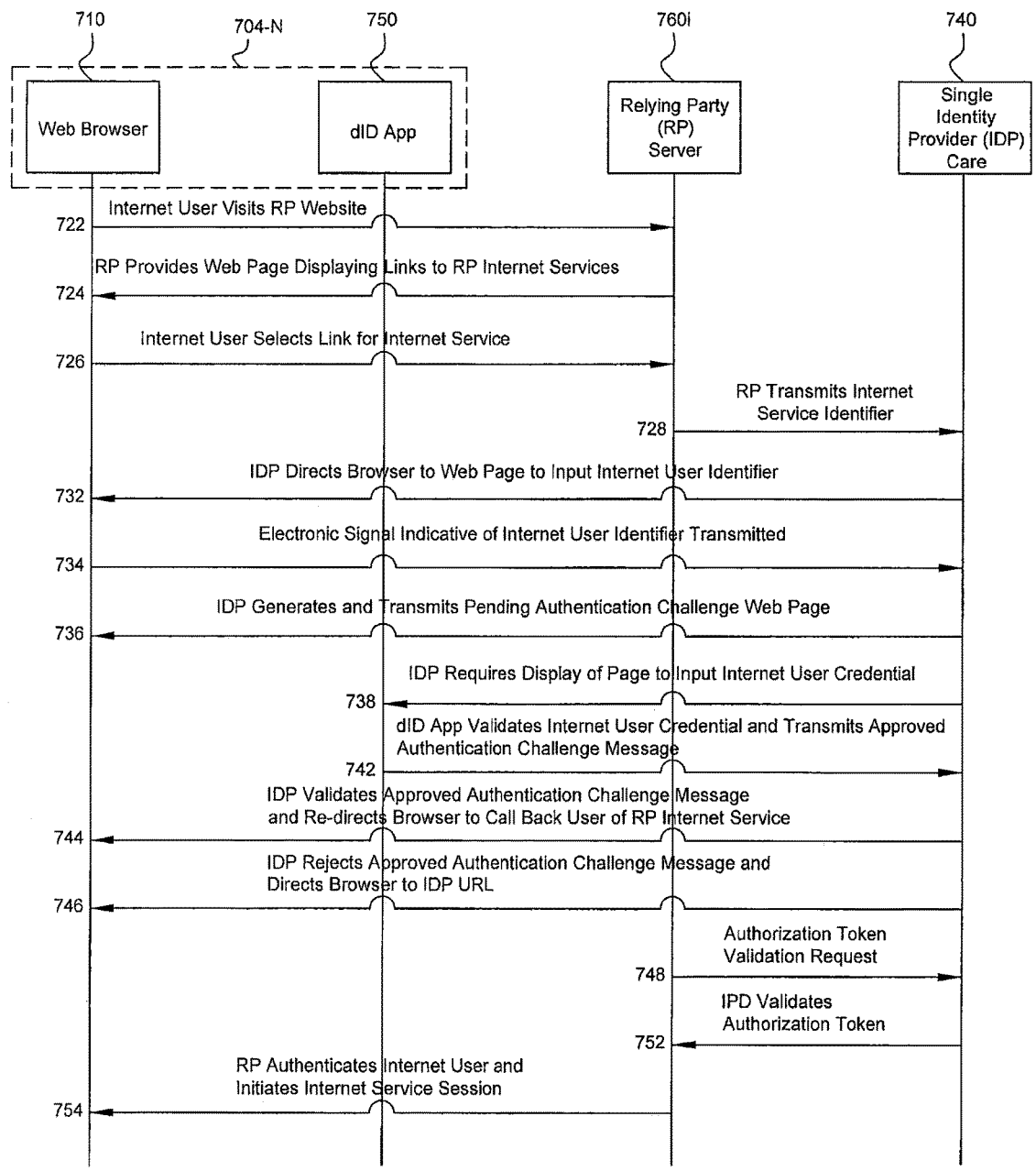
FIG. 7 is a flow chart illustrating a computer-implemented method of authorizing respective access by each of a plurality of Internet users to a respective one or more Internet services provided by each of a plurality of Internet service providers according to some embodiments.

In various embodiments, as a repository of information (e.g. identity repository 140), IDP service core (150, 250) of the single IDP can store respective Internet user and/or respective Internet user device identity records, his/her respective public key portions of dID app created authentication tokens and bindings, respective RP identity records and/or respective Internet service identity records for respective Internet services provided by each RP, and a history of authentication requests (e.g. pending, expired, acted upon, etc.) transmitted over the Internet. In various embodiments, an Internet user N can interface over the Internet with IDP service core 150-N via user interface 110 and communications interface A 130, authenticate to IDP service core 150 via authentication engine 120 and using dID app (FIG. 7) residing on one of more of his/her devices (e.g. his/her mobile device) and a web browser residing on one or more of his/her devices (e.g. his/her mobile device) to manage his/her identity, his/her devices respective identity, and his/her authentication tokens. In various embodiments, and as discussed in more detail below, a dynamic catalog of respective Internet users' and/or respective Internet users' device(s) identity records maintained in identity repository 140 can be changed based on an Internet user's input, an Internet user device(s)' approval/rejection by the single IDP, and/or an IDP administrator's input (e.g. based on a user's subscription to the IDP service) of the single IDP. In various embodiments, IDP service core 150 of the single IDP can generate a unique anonymous identifier code for an Internet user. Internet users within one organization can be segregated from Internet users in other organizations and Internet users in one portion of an organization can be can be segregated from Internet users in other portions of the same organization. Internet users working on one project for an organization can be segregated from Internet users working on another project for the same organization. Although the breakdown is by organizations, portions of organizations, or projects within organizations, in these examples, portals may be used for providing access to Internet users in other segregational or classification schemes. Internet users are referred to generically as users of devices (such as for example devices 102, 104, 106).

The authentication engine 120 of the single IDP manages and provides multifactor device based authentication capabilities for IDP service core (150, 250) of the single IDP to authorize respective access by each of a plurality of Internet users to a respective one or more Internet services provided by each of a plurality of Internet accessible RPs, dID application (FIG. 1), RPs 160-i (260-i), and respective Internet services provided by each of the RPs, including without limitation the operations of Internet user(s), Internet user device(s), RP(s), and RP(s)' services, registration, validating Internet user(s), Internet user device(s), RP(s), and RP(s)' services, registration information, encrypting and decrypting information, binding key portions of authentication tokens and Internet user and/or Internet user device information, generating authentication challenge request notification messages, and/or validating Internet user authentication requests to access Internet services provided by RPs.

In various embodiments, IDP service core 150 of the single IDP can also operate as a networked interface for respective administrators 108-i of RPs 160-i. In various embodiments, IDP service core 150 can allow various RPs 160-i to respectively register the RP and Internet services provided by the RP, with IDP service core 150 over a communications network, and provide registration information about RPs 160-i respective Internet services over a communications network (e.g. using a web browser to interface with a web server of the single IDP). In various embodiments, the single IDP requires relying parties 160-i to register with the single IDP in order for the single IDP to broker Internet users' access Internet services provided by the RPs. In various embodiments, the single IDP requires each RP 160-i to provide an input (e.g. via respective RP interface 165-i) that adds each respective RP Internet service for which the respective RP desires the single IDP to broker Internet users' access. In various embodiments, IDP service core 150 requires, during an initial registration process, the single IDP requires each RP 160-i to provide (e.g. via respective RP interface 165-i) respective registration information such as, for example, one or more respective RP identifiers (e.g. RP name, RP image, RP logo) that are visually perceptible when displayed on a page of the dID app and/or when displayed on a web page belonging to the RP 160-i, one or more respective call-back Internet addresses for each respective Internet service provided by the respective RP 160-i and/or for the respective RP 160-i, and a respective base Internet address for each Internet service provided by the respective RP 160-i and/or for the respective RP 160-i. In various embodiments, a POST is performed with an appropriate string of data, e.g., JSON data.

In various embodiments, IDP service core 150 can generate a respective unique RP Identifier Code (RPIC) for each RP 160-i. In various embodiments, the unique RP Identifier code allows the IDP service core 150 to identify authentication requests received over a communications network from varied RPs 160-i. In various embodiments, during an initial registration process, IDP service core 150 may generate a respective unique Internet service identifier (e.g. uniquely generated pseudorandom string) for each Internet service provided by each respective RP. In various embodiments, the unique Internet service identifiers allow the IDP service core 150 to identify an Internet user request to access the particular Internet service from a plurality of Internet services provided by a plurality of RPs 160-i. In various embodiments, the unique Internet service identifiers allow the IDP service core 150 and respective RP 160-i to validate respective IDP service core 150 re-directions to a respective call back Internet address. In various embodiments, IDP service core 150 can generate a respective unique Internet service secret (e.g. uniquely generated pseudorandom string) for each Internet service provided by each respective RP. In various embodiments, the respective unique Internet service secrets allow the IDP service core 150 and respective RP 160-i to validate respective IDP service core 150 re-directions to a respective call back Internet address. In various embodiments, the respective unique Internet service secrets and respective unique Internet service identifiers allow the respective RP 160-i to interface with IDP service core 150 to configure their respective Internet service to accept Internet user requests to access the respective Internet service by implementing Open ID Connect protocols such as, for example, an Authorization Code Flow of Open ID Connect Protocols (e.g. OAuth 2.0). In various embodiments, IDP service core 150 can generate a respective unique pseudorandom domain identifier (e.g. a unique pseudorandom string) for each RP and/or for each Internet service provided by each respective RP. In various embodiments, IDP service core 150 may prompt the respective RP to create a TXT record at the domain name server (DNS) (not shown) at the respective base Internet address for the RP, and/or at the respective base Internet address for the respective Internet service provided by the respective RP, using the respective unique pseudorandom domain identifier. In various embodiments, IDP service core 150 may query the domain name server (DNS) (not shown) to locate a respective unique pseudorandom domain identifier to activate the respective RP, and/or the respective Internet Service provided by the respective RP, such that the IDP service core 150 will accept authentication challenges from the respective RP, and/or Internet user requests for access to the respective Internet Service provided by the respective RP.

Figure 2:
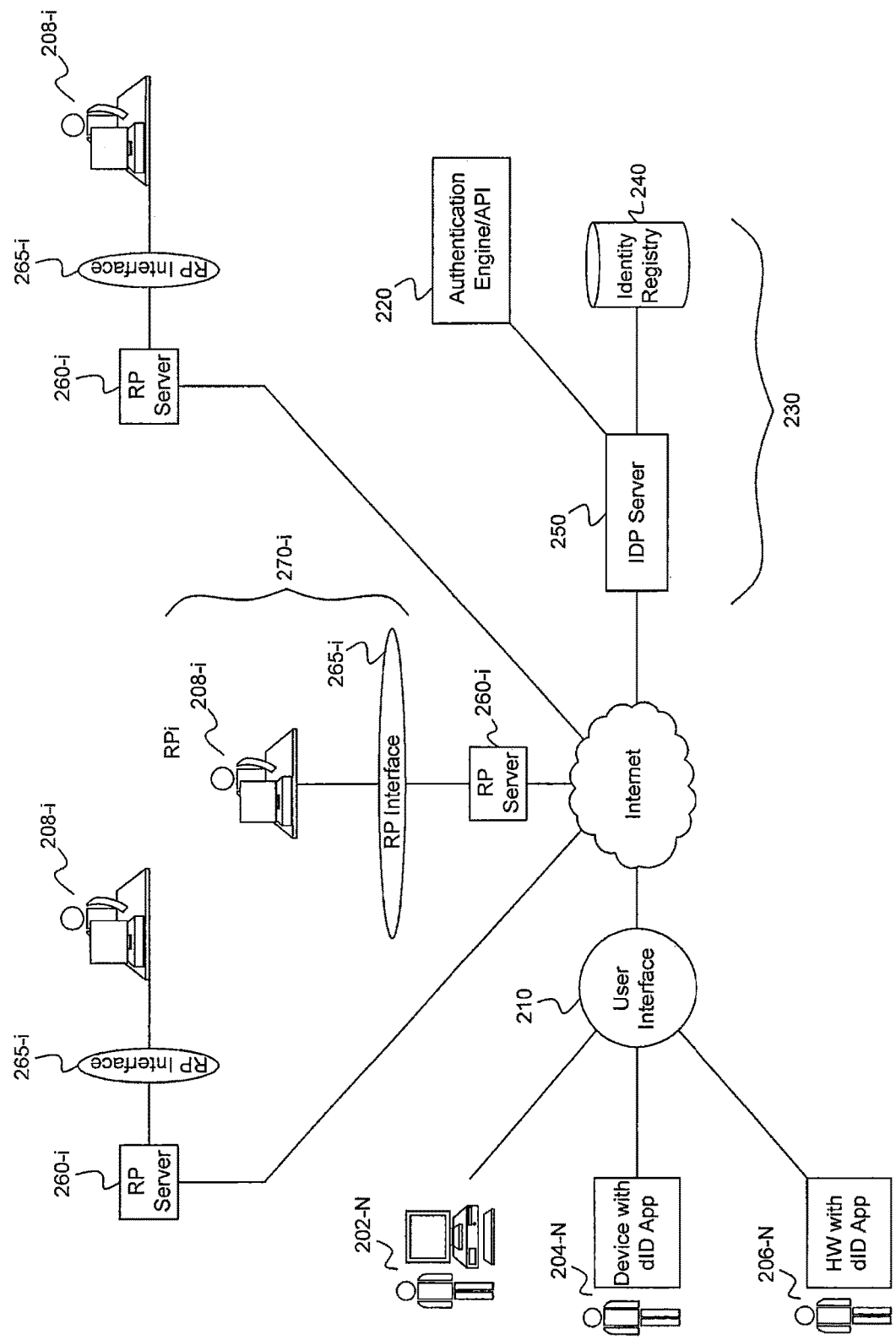
FIG. 2 is a block diagram of an example of a system in accordance with some embodiments of the present disclosure.

Referring now to FIG. 2, a system 200 according to some embodiments includes one or more devices (e.g. HW device 106, mobile device 104, desktop device 102) of one or more Internet users, a remote IDP network 230, and remote RP networks 270 to respective RPs 160-i. The remote IDP network 230 may include networked one or more IDP servers (e.g., server computers) 250, authentication engine 220, and one or more identity repositories 240. For convenience, the following description refers to server 250 and repository 240, although any number of servers and/or storage units may be used. Authentication engine 220 can provide authentication services to various RPs and various Internet users over the Internet as described for authentication engine 120. Repository 240 can store, for example, registration information of single IDP registered Internet users and/or single IDP registered Internet user device(s) such as, for example, Internet user names, e-mail addresses, public key portions of dID app created authentication tokens, anonymous identifiers, device identifiers of one or more Internet user devices, and/or a history of authentication requests (e.g. pending, expired, acted upon, etc.) transmitted over the Internet. In various embodiments, IDP servers 250 includes suitable database software running in conjunction with IDP software, such as, for example with identity repository 240. In various embodiments, identity repository 240 can be deployed on a server of the single IDP in a secure data center.

Figure 8:
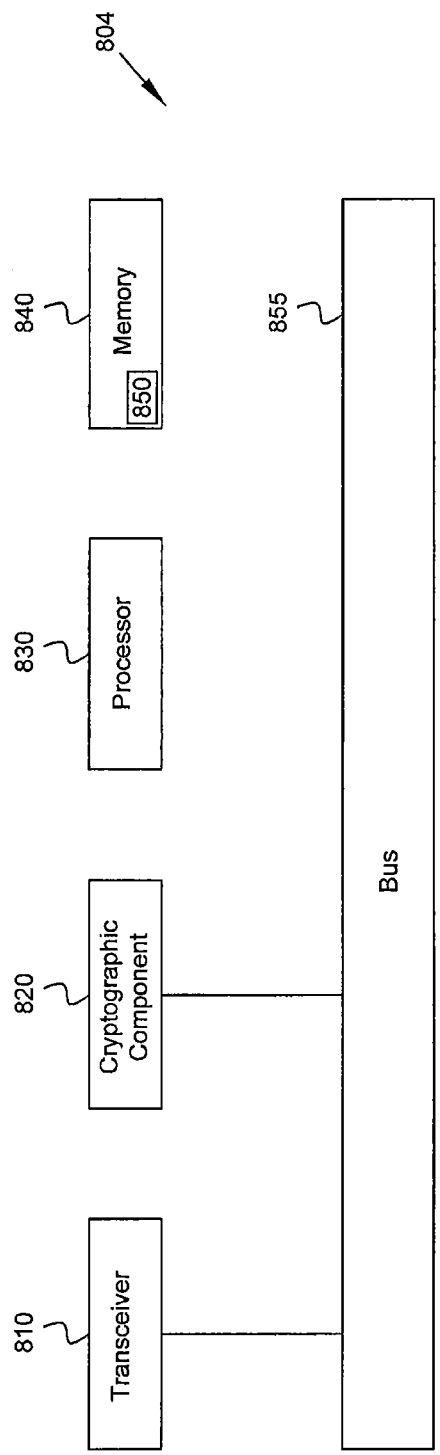
FIG. 8 is a block diagram of a mobile device according to some embodiments.

Referring now to FIG. 8, each mobile or hand-wearable device 804 (mobile device 104 or HW device 106) can include a transceiver 810, a cryptographic component 820, a computer processor 830, one or more memory components 840, and a device identity provider application (dID app such as, for example, a PrivaKey™ device identity and authentication application) 850 stored in the memory component(s) 840. Memory component(s) 840 may be any suitable type of memory of various types of memory, e.g., flash memory, RAM, in-memory data grids, in-memory database (e.g. IMDB, MMDB, memory resident database, etc.), keychain software (e.g. Apple® Keychain). Device 804 may also include an input component such as a keyboard (not shown). The keyboard may be a physical keyboard with buttons that the user may press, or it may be a virtual keyboard that is displayed on a touch sensitive screen that is also used to display output. A microphone, a camera, an identification code reader, and/or a speech recognition module may optionally be used for providing input to device 804. In various embodiments, device 804 includes a biometric identification reader (e.g. fingerprint scanner, camera) configured to read biometric information (e.g. a fingerprint, a facial image) from an Internet user. In various embodiments, device 804 includes an identification code reader (e.g. QR code reader, barcode reader) configured to read an IDP-service generated recovery key embedded in a QR code and/or barcode on, for example, a printed paper to allow an Internet user to regain access to Internet services provided by RPs that are pre-registered with IDP service core (150, 250) and if all of the one or more Internet user's devices (104, 106, 102), having an instance of the dID app installed thereon, are destroyed, lost, or stolen.

Transceiver 810 is capable of communication with a remote device (e.g., server 150, 250) over a wired or wireless communication link, e.g., using a communications protocol such as HTTP or HTTPS or Open ID Connect. Cryptographic component 820 may include a cryptographic engine for generating encryption keys including, for example, cryptographically secure symmetric keys (e.g. for HTTPS transmissions over a network security protocol such as, for example, SSL or TLS), a cryptographically secure encryption key generated using inputs received from dID app, and/or an application programming interface call from a server of the single IDP 150, and a predetermined cryptographic algorithm (e.g. AES-256), and/or asymmetric key pairs. In various embodiments, cryptographic component 820 can be configured to perform hardware-based encryption, software-based encryption, and/or combinations thereof. In various embodiments, cryptographic component 820 can use one or more of such generated keys to encrypt and decrypt information. Device 804 may also include an audio output component (not shown) including a speaker or an audio output jack capable of providing audio to headphones via a suitable cable. Processor 830 is operatively coupled to control transceiver 810, cryptographic component 820, and memory component(s) 840, e.g., via a bus 855. The Internet user of device 804 can run dID application 850 to perform various tasks as described herein.

In various embodiments, the dID app 850 operates as an identity wallet, including generating an authentication token, including a respective asymmetric key pair of a private key portion and a public key portion, with which respective portions the dID app 850 and the single IDP service core (FIG. 1 (150), FIG. 2 (250)) use, in part, to complete or reject authentication requests to access an Internet service provided by a relying party (RP) 160-*i* and initiated by an Internet user selection of a link on a web page belonging to the relying party (RP) transmitted over the Internet, and brokered by the IDP service core (FIG. 1 (150), FIG. 2 (250)). In some embodiments, the IDP service core (150, 250) of the single IDP can broker the authentication request initiated by an Internet user selection of a link on a web page belonging to an RP 160-*i*, and transmitted from the RP 160-*i*, by pre-registering the Internet user and/or one or more of the Internet user devices (e.g. one or more of the Internet user devices where a respective instance of dID app 850 resides, the Internet user device associated with the Internet user's web-based authentication request), pre-registering the RP 160-*i* and the Internet service provided by the RP 160-*i* and to which the Internet user has requested access, requiring, in response to the Internet user's selection of the link on the web page belonging to the RP 160-*i*, that the RP 160-*i* send an API call (e.g. a GET or POST request) to the identity service provider including a call-back Internet address (e.g. URL), validating the call-back URL with one or more pre-registered Internet addresses (e.g. URL), identifying the requested Internet service with an Internet service identifier in the request, requiring the web browser to display a web page belonging to the identity service provider and requiring input of an Internet user identifier (e.g. an electronic mail address, an IDP service generated anonymous identifier, an identifier derived from a pre-existing, external token, such as a U.S. Government issued Personal Identity Verification card, etc.), requiring the dID app 850 to display a page to input an Internet user credential (e.g. PIN, biometric factor, combination thereof), receiving, via an API call from dID app 850 an approved authentication challenge message, validating the received approved authentication challenge message electronic signals using the public key portion stored (e.g. in identity registry 140, 240), and re-directing the web browser of the Internet user to a pre-registered callback Internet address of the requested RP 160-*i* Internet Service, or directing the web browser of the Internet user to an Internet address of the single IDP, based on the result of the validation. In various embodiments, the authentication engine 120 of IDP service core (150, 250) and communicates and displays the appropriate web page for the authenticated Internet user to access the Internet service provided by the RP 160-*i*, or the appropriate web page for the unauthenticated Internet user, at the user interface (110, 210). In various embodiments, the RP 160-*i* and IDP service core (150, 250) further validate the result of the authentication with a validation token (e.g. identifier token) transmitted to the RP 160-*i* in an API call when the web browser was re-directed to the pre-registered callback Internet address of the requested RP Internet Service. In various embodiments, the validation token is a JSON Web Token (JWT).

In various embodiments, a server of the RP 160-*i* may transmit a service call to IDP service core (150, 250)

including a received validation token, a unique Internet service secret, a unique Internet service identifier, to an Open ID Connect discovery endpoint at the IDP service core (150, 250) using, for example, a network security protocol such as Secure Socket Layer (SSL) or Transport Layer Security (TLS), IDP service core (150, 250) may validate the received validation token, Internet service secret, and Internet service identifier against pre-registered values, and may transmit, via a return API call to the server of the RP 160-*i* using SSL or TLS, a subject identifier used to identify the Internet user to RP 160-*i*. In various embodiments, the subject identifier is an OpenID Connect Protocol subject identifier, i.e. a locally unique and never reassigned identifier string within the IDP service core (150, 250) for the Internet user, which is intended to be consumed by RP 160-*i*, does not exceed 255 ASCII characters in length, and is case sensitive (e.g. 24400320 or AItOawmwtWwcT0k51BayewNvutrJUqsv16qs7A4). In various embodiments, IDP service core (150, 250) may validate an Internet service secret and Internet service identifier, received from a server of the RP 160-*i* using SSL or TLS, against pre-registered values, and may transmit, via a return API call to the server of the RP 160-*i* using SSL or TLS, a validation token that the RP 160-*i* may parse a subject identifier from to identify the Internet user to RP 160-*i*. In some embodiments, an encryption switch (356) of the IDP service core (150, 250) may digitally sign the validation token with a private key of the IDP service provider (150, 250), transmit the digitally signed validation token in an API call to the RP 160-*i* using communications interface B 135, a server of the RP 160-*i* may validate the validation token using a public key of the IDP service provider, and may parse a subject identifier out of the validated validation token to identify the Internet user to RP 160-*i*. In various embodiments, a server of the RP 160-*i* may transmit a service call to an Open ID Connect discovery endpoint (e.g. at an IDP service core (150, 250) at /well-known/openid-configuration) to receive configuration details for the IDP service provider from the Open ID Connect discovery endpoint (e.g. the response includes a parameter jwks_uri, which identifies the location of the JSON Web Key Set, which includes the public key of the IDP service provider.)

In various embodiments, identity provider services using the dID app are made accessible to each Internet user of a respective instance of application 850 with a one-time license fee. For example, device 804 (104, 106) may be provided to Internet users with dID application 850 already provided (loaded or installed) therein to operate on the respective device operating system (OS) (e.g. Android, iOS, MAC OS, Windows, Blackberry OS, etc.), and the license fee incorporated into the cost of the respective device which may entitle the Internet users to usage of respective device 804 (104, 106) and respective dID application 850 for the lifetime of respective device 804 (104, 106). In some embodiments, dID application 850 may be made available for Internet users to download (e.g., from a website or another application for downloading device applications (e.g. Apple's App Store, Google Play Store, Blackberry World, Microsoft Store, etc.) for a one-time license fee. Thus, in various embodiments, Internet users can avoid having to pay on a per-authentication basis (e.g., fixed or variable fee per authentication request initiated by the Internet user requesting access to an Internet service provided by a RP) or on a subscription basis (e.g., involving a monthly or annual subscription fee). A one-time license fee may entitle the Internet users of dID application 850 to unlimited authentication requests initiated by each Internet user's respective requests to access respective Internet services provided by various RPs 160-*i*.

In various embodiments, RPs 160-*i* using the IDP service core 150 can be charged based on the number of IDP service core 150 and dID application 850 authentications for RP 160-*i* provided services. For example, the dID application 850 can be provided free-of-charge to Internet users (e.g. as a free download on his/her respective device 804, 104, 106) and IDP service core 150 can permit unlimited use of dID application 850 by Internet users at no charge but may charge each RP based on the respective number of authentications for the respective RP 160-*i* provided services.

Internet User dID Application Interface

Figure 4A:
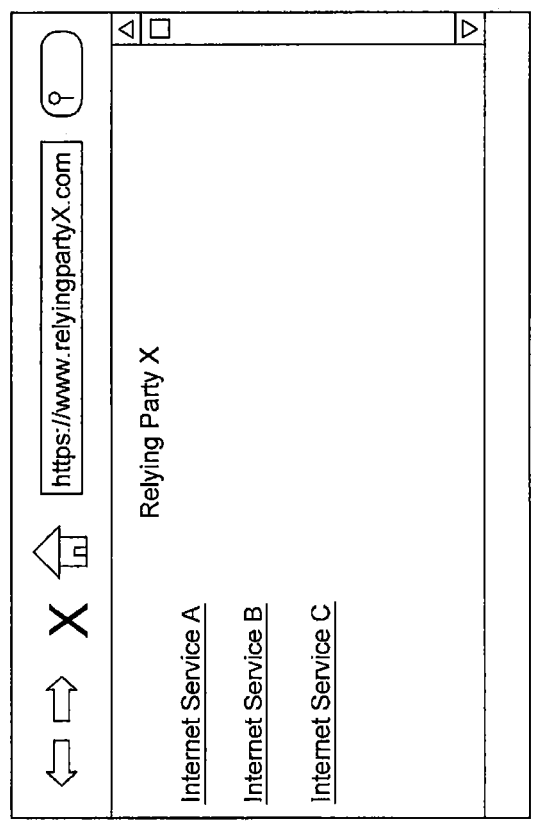
FIGS. 4A-4B are illustrative screenshots of examples of Internet user interfaces to relying party Internet services according to some embodiments of the present subject matter.
Figure 4B:
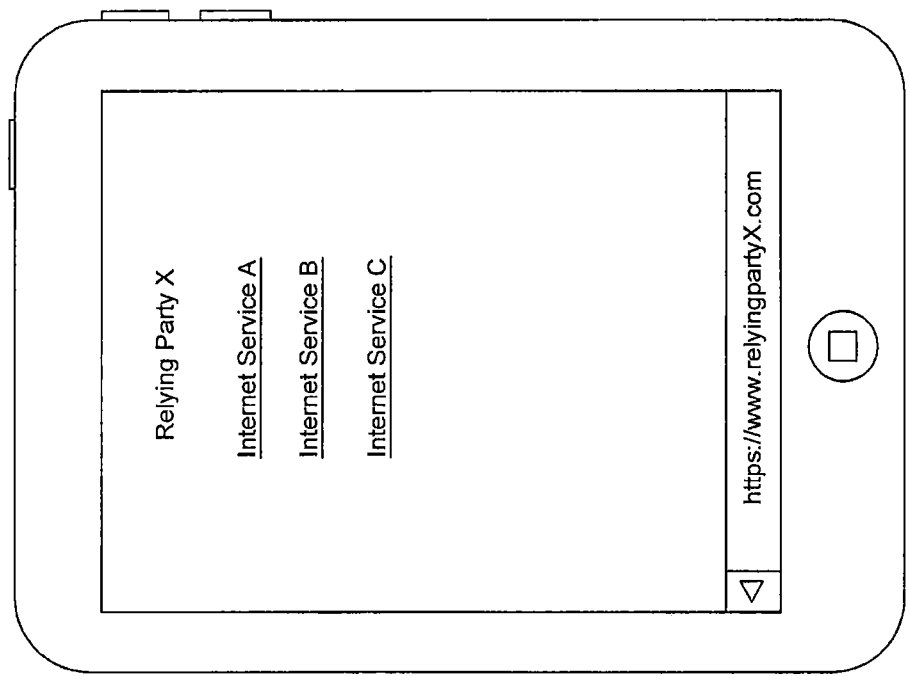

Referring now to FIGS. 4A-4B, illustrative screenshots of examples of Internet user interfaces to relying party Internet services according to some embodiments of the present subject matter are provided. With reference to FIGS. 4A and 4B, an example of a relying party (RP) (160, 260) website screenshot on a respective web browser of an Internet user device (102, 202) and a respective web browser of another Internet user device (804, 104, 204) according to some embodiments is provided. In the illustrated embodiments of FIG. 4A, dID app 850 Internet users make a selection of a link displayed on the Relying Party "X"'s web page identifying an Internet service provided by the RP using a keyboard, pointing device, e.g., a mouse or a trackball, or other kinds of devices to interact with Internet user interface (110, 210) and the RP's (160-*i*, 260) website. In the illustrated embodiments of FIG. 4B, dID app 850 Internet users make a selection of a link displayed on the Relying Party "X"'s web page identifying an Internet service provided by the RP using a touch screen display. Input from the Internet user can be received in any suitable form, including acoustic, speech, or tactile input, and indicates the Internet's users request to access the selected Internet service provided by the RP. A web browser of any suitable device (e.g. 106, 206) can be utilized to display web pages of the RP (160-*i*, 260-*i*) website and to receive inputs from the Internet user.

In various embodiments, a call or request from a web browser to a server (e.g. a web server) of a relying party (e.g. relying party X) or to a server of a single identity provider may be made using HTTP or HTTPS. For example, HTTP defines several "verbs" including without limitation, GET, POST, PUT, HEAD, TRACE, OPTIONS, CONNECT, and DELETE. The single identity provider service may use any one or several of these verbs and may define a pattern of URLs to correspond to certain authentication or Internet service entities. For example, performing a GET on a given URL may be used to direct a web browser to an Internet address of, and displaying content of, a web page belonging to the single identity service provider. Performing a POST on a given URL may be used to direct a web browser to another Internet address of, and displaying content of, another web page belonging to the single identity service provider.

In some embodiments, an API call may return a single JSON object (which may have inner objects) (e.g. a JSON Web Token (JWT)), a list of JSON objects, or a location of a JSON object (e.g. a location of a JSON Web Key Set). The documentation for a specific API call may determine the type of returned object returned by the respective field (e.g., a validation token may have a "user identifier" field, a validation request may have a "validation token" field, an "Internet service secret" field, an "Internet service identifier"

field, an authentication request may have a "call-back Internet address" field, an an "Internet service identifier" field, etc.). Any number of fields may be specified, depending upon the particular service provided or requested by the API call. Furthermore, a default set of fields may be provided. In various embodiments, a response to an API call using JSONP (JSON with padding) may be employed to request data from a server in a different domain whereby the calling application supplies the name of a function in the global namespace. The respective API call, instead of returning the data, may return JavaScript to call this function and pass the appropriate data. For example, an API call may specify a query parameter "callback" setting it to the name of the function. The returned JSON may then be wrapped with "<function-name>("and ");", for example. In various embodiments, APIs may include a variety of levels of security. For example, initial security may be implemented through the use of a TLS or SSL tunnel in communications over Communications Interface A 130 and over Communications Interface B 135 with single identity service provider core 150. In various embodiments, API calls made to single identity service provider core 150 may use HTTPS rather than HTTP and any call not so encrypted may be rejected.

Figure 5A:
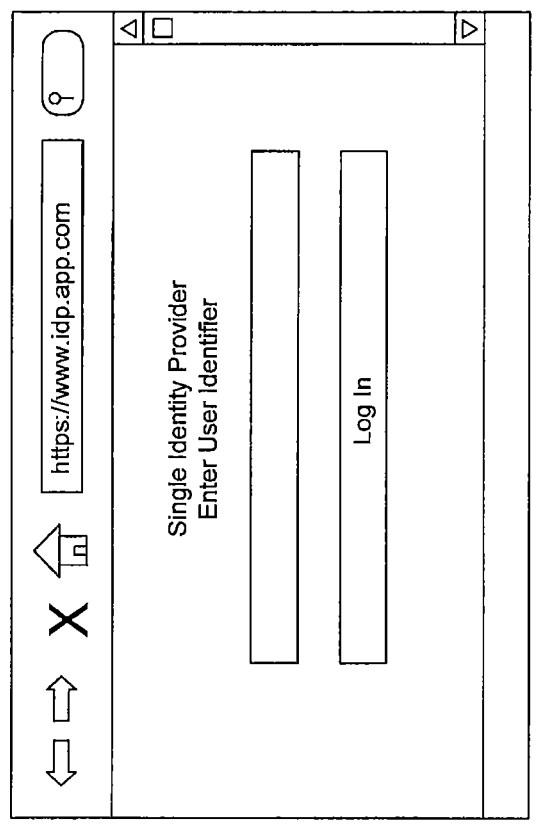
FIGS. 5A-5H are illustrative screenshots of examples of Internet user interfaces to single identity provider Internet services, Internet user interfaces to an identity provider application residing on a device, and Internet user interfaces to a relying party Internet service, according to some embodiments of the present subject matter.
Figure 5B:
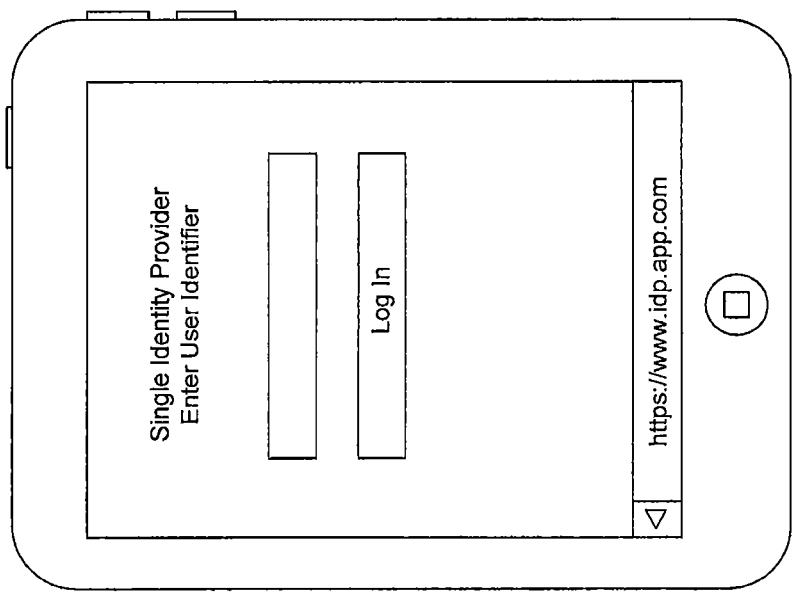

Referring now to FIGS. 5A-5D, illustrative screenshots of examples of Internet user interfaces to single identity provider Internet services according to some embodiments of the present subject matter are provided. With reference to FIGS. 5A and 5B, an example of a single identity provider (150, 250) website screenshot on a respective web browser of an Internet user device (102, 202) and a respective web browser of another Internet user device (804, 104, 204) according to some embodiments is provided. In the illustrated embodiments of FIGS. 5A and 5B, the respective web browser of the respective Internet user is directed to the website of the single identity provider (150, 250) in response to the respective Internet user's selection of a link displayed on the respective RP's web page (e.g. FIGS. 4A, 4B) that identified a respective Internet service provided by the RP. As shown in FIGS. 5A and 5B, the single identity provider (150, 250) requires dID app 850 Internet users to provide an input of an Internet user identifier (e.g. an electronic mail address, an IDP service generated anonymous identifier). In various embodiments, a POST may be performed with an appropriate string of data, e.g., JSON data. In the illustrated embodiments of FIG. 5A, dID app 850 Internet users provide an input of his/her Internet user identifier using a keyboard, pointing device, e.g., a mouse or a trackball, or other kinds of devices to interact with Internet user interface (110, 210) and the single IDP's (150, 250) website. In the illustrated embodiments of FIG. 5B, dID app 850 Internet users provide an input of his/her Internet user identifier using a touch screen display. Input from the Internet user can be received in any suitable form, including acoustic, speech, or tactile input, to initiate the dID app 850. A web browser of any suitable device (e.g. 106, 206) can be utilized to display web pages of the single identity provider (150, 250) website and to receive inputs from the Internet user.

Figure 5C:
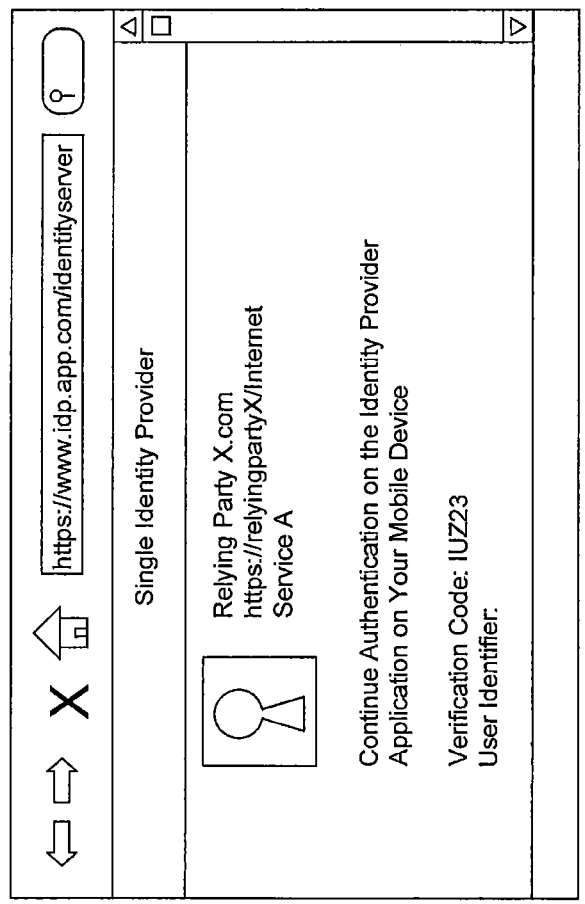
Figure 5D:
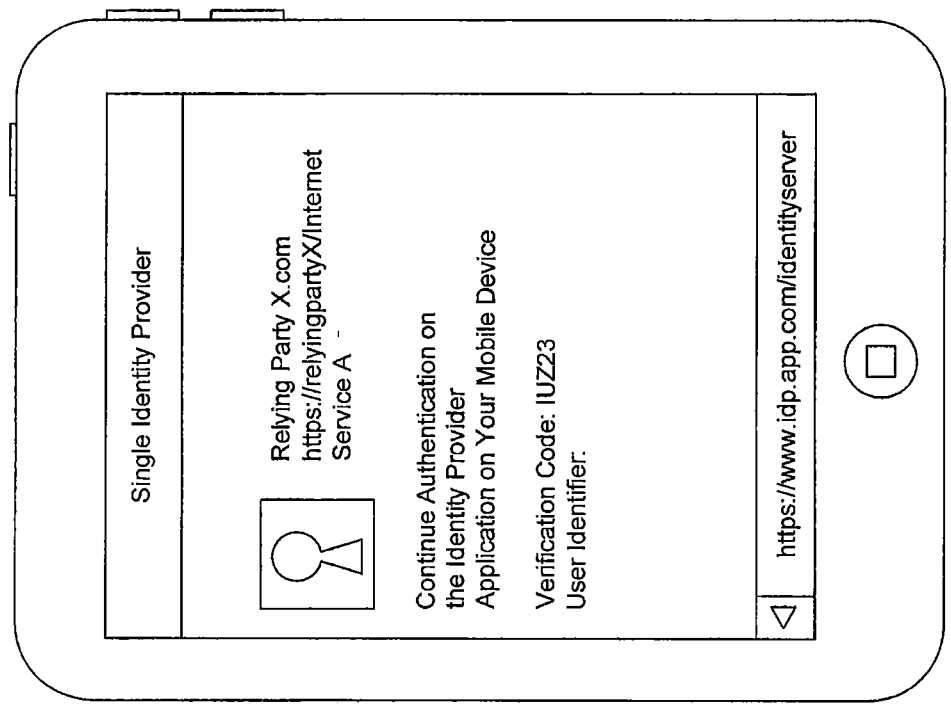

With reference to FIGS. 5C and 5D, an example of a single identity provider (150, 250) website screenshot on a respective web browser of an Internet user device (102, 202) and a respective web browser of another Internet user device (804, 104, 204) according to some embodiments is provided. In the illustrated embodiments of FIGS. 5C and 5D, the respective web browser of the respective Internet user is directed to another web page of the website of the single identity provider (150, 250) in response to the successful validation of the respective Internet user's identifier received by the single IDP (e.g. FIGS. 5A, 5B). In various embodiments, in response to successful validation of the Internet user identifier, the single IDP automatically generates, and transmits to the web browser, a web page such as the web page depicted in the examples of FIGS. 5A and 5B. As shown in the illustrated embodiments of FIGS. 5C and 5D, the respective web browser may display a web page that displays a respective visually perceptible identifier of the respective RP 160-*i* (e.g. RP name ("Relying Party X", RP image (key hole image)), a respective Internet address of a respective web page belonging to the respective RP 160-*i* (e.g. "https://www.relyingpartyX.com/InternetServiceA"), a notification to the Internet user, a verification code generated by the single IDP (e.g. "IUZ23"), and an Internet user identifier (e.g. the Internet user identifier received by the single IDP (e.g. FIGS. 5A, 5B)). A web browser of any suitable device (e.g. 106, 206) can be utilized to display web pages of the single identity provider (150, 250) website.

Figure 5E:
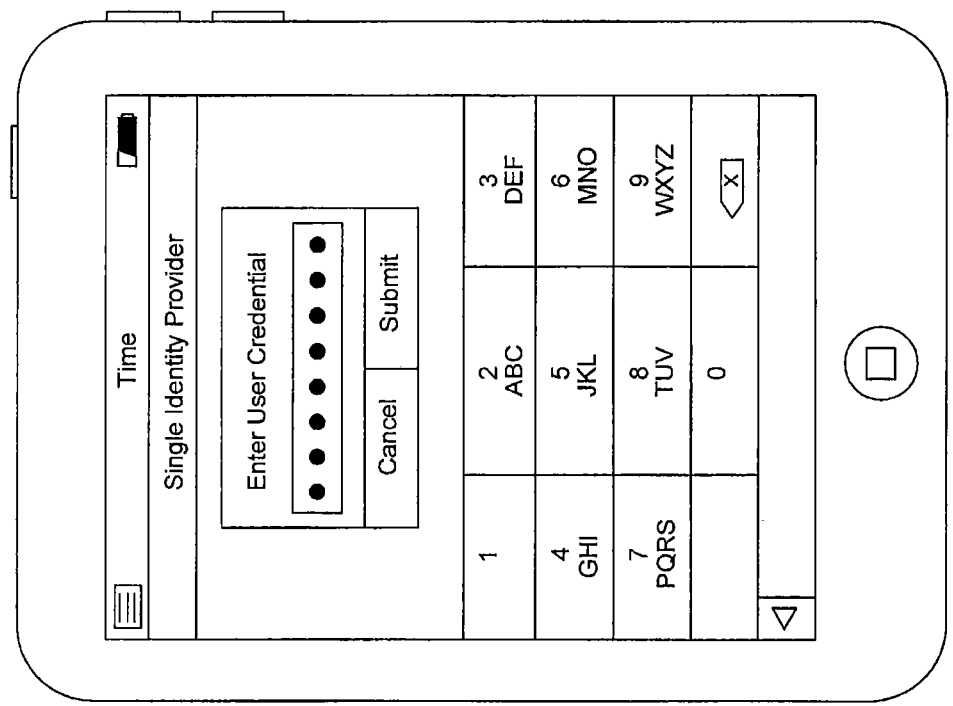
Figure 5F:
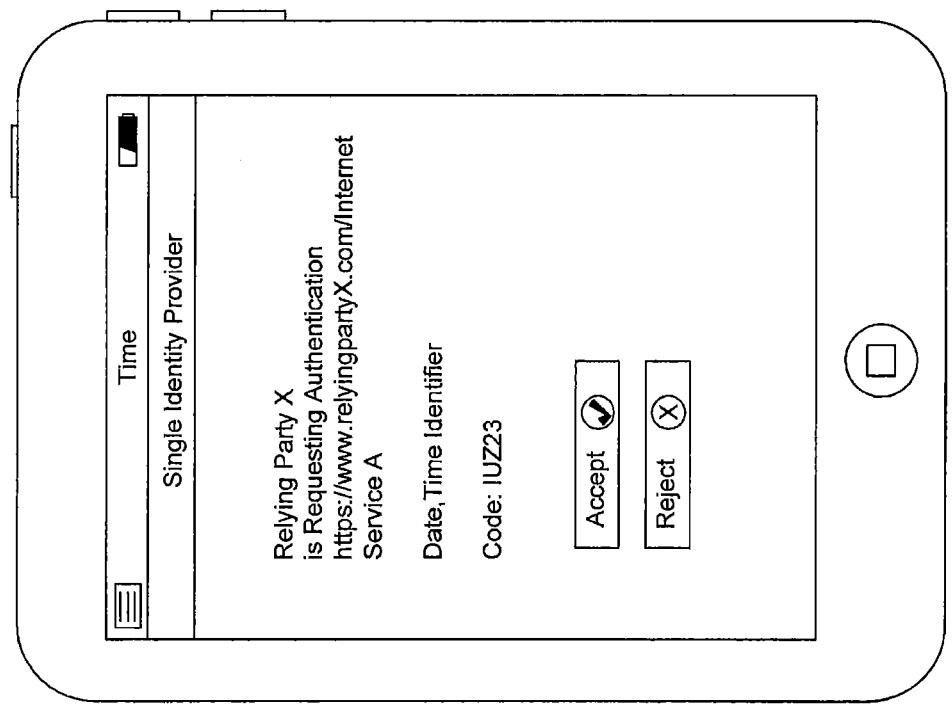
Figure 5G:
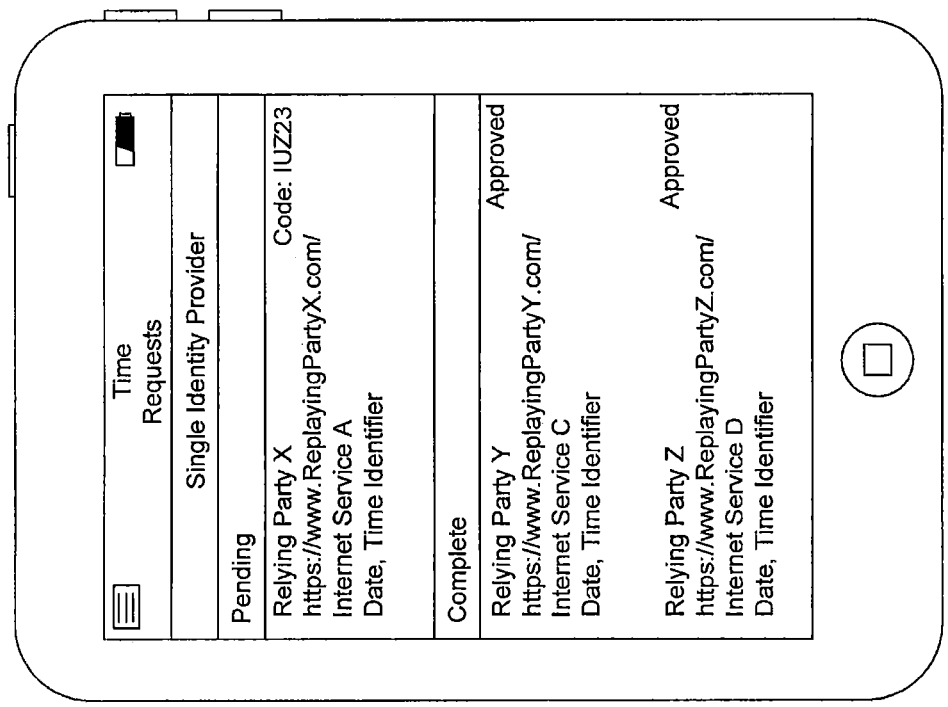

Referring now to FIGS. 5E-5G, illustrative screenshots of examples of Internet user interfaces to dID app 850 residing on an illustrative Internet user device (804, 104, 204) according to some embodiments of the present subject matter are provided. As shown in FIGS. 5E-5G, a touch-screen display may be provided. Input from the user of device (e.g. 804, 104, 106) can be received in any suitable form. In the illustrated embodiments, a device (e.g. 804, 104, 106) including a touch screen display is provided. In various embodiments, device (e.g. 804, 104, 106) can include any suitable device such as, for example, a mobile device, a personal digital assistant, a cellular phone, a tablet, an electronic personal planner, a slate tablet, a booklet computer, a convertible notebook, a phablet, a smart phone, a human-wearable computing device, a networked microprocessor-based computer in an automobile, etc. For example, an illustrative touch-screen display can be any suitable touch screen display. For example, touch screen display can be a cathode ray tube (CRT) touch screen display, a liquid crystal touch screen display (LCD), a LCD resistive touch screen display, a LCD capacitive touch screen display, a LCD multi-touch capable touch screen display, etc. In various embodiments, a processor of a device (e.g. 804, 104, 106) can support a markup language (e.g. HTML5, HTML4 with jQuery, CSS3, PHP 5.6) including a suitable selection API (e.g. native Drag and Drop API, Long Touch API) for Internet user selections on a display of the device (e.g. 804, 104, 106). In some embodiments, display of device (e.g. 804, 104, 106) is a display that is enabled by an input of the user that is non-tactile.

With reference to FIG. 5E, dID app 850 residing on a pre-registered device (e.g. 804, 104, 106) of the Internet user is initiated to display a page to receive an input of a user credential of the Internet user (e.g. PIN, biometric factor, combination thereof) in response to the successful validation of the respective Internet user's identifier received by the single IDP (e.g. FIGS. 5A, 5B). In various embodiments, single IDP core (150, 250) requires the dID app 850 to display the page to input the Internet user credential. In various embodiments, the processor of device (e.g. 804, 104, 106) automatically initiates dID app 850 in response to receiving an API call from a server (e.g. 352) of the single IDP (150, 250). In some embodiments, a notification to the Internet user displayed on a web page of the single IDP (e.g. FIGS. 5C, 5D) instructs the Internet user to initiate the dID app 850 to display the page to input the Internet user credential. In various embodiments, an Internet user may launch the dID application 750 by pressing (or clicking, or otherwise activating) an icon (or other suitable hypertext, image, hot spot, etc.) of the web page depicted in the examples of FIGS. 5A and 5B displayed on web browser 710. Referring to FIG. 5F, dID app 850 residing on the pre-registered device (e.g. 804, 104, 106) of the Internet user displays a page that displays a respective visually perceptible identifier of the respective RP 160-*i* (e.g. RP name ("Relying Party X", RP image (key hole image)) (e.g. FIGS. 5C, 5D), a respective Internet address of a respective web page belonging to the respective RP 160-*i* (e.g. "https://www.relyingpartyX.com/InternetServiceA") (e.g. FIGS. 5C, 5D), a date identifier (e.g. the date (e.g. "Nov. 31, 2014" of the Internet user's selection of a link displayed on the respective RP's web page (e.g. FIGS. 4A, 4B)), a time identifier (e.g. the time (e.g. "10:28:49 AM EDT" of the Internet user's selection of a link displayed on the respective RP's web page (e.g. FIGS. 4A, 4B)), and a verification code generated by the single IDP (e.g. "IUZ23") (e.g. FIGS. 5C, 5D), in response to the successful validation of the respective Internet user's credential received by the dID app 850 (e.g. FIG. 5E), and requiring an input (e.g. selection of "Accept" or selection of "Reject") from the Internet user to generate and/or transmit an approved authentication challenge message via an API call to a server (e.g. 352) of the single IDP. In various embodiments, dID app 850 automatically generates and transmits an approved authentication challenge message via an API call to a server (e.g. 352) of the single IDP in response to the successful validation of the respective Internet user's credential received by the dID app 850 (e.g. FIG. 5E).

With reference now to FIG. 5G, in various embodiments, dID app 850 residing on a pre-registered device (e.g. 804, 104, 106) of the Internet user may display a page that displays a plurality of respective visually perceptible identifiers of respective RPs 160-*i* (e.g. RPs name ("Relying Party X") (e.g. FIGS. 5C, 5D), respective Internet addresses of respective web pages belonging to the respective RPs 160-*i* (e.g. "https://www.relyingpartyX.com/InternetServiceA", "https://www.relyingpartyY.com/InternetServiceC, "https://www.relyingpartyZ.com/InternetServiceD") (e.g. FIGS. 5C, 5D, 5G), a date identifier (e.g. the date (e.g. "Nov. 31, 2014" of the Internet user's respective selection of respective links displayed on the RPs' respective web pages (e.g. FIGS. 4A, 4B)), a time identifier (e.g. the time (e.g. "10:28:49 AM EDT" of the Internet user's respective selection of respective links displayed on the RPs' respective web pages (e.g. FIGS. 4A, 4B)), respective verification codes generated by the single IDP (e.g. "IUZ23") (e.g. FIGS. 5C, 5D), and respective status identifiers (e.g. "pending", "completed", "rejected") of authorizing respective access by the respective Internet user to the respective requested Internet services provided by the respective RPs. In various embodiments, dID app 850 may display a page as illustrated in FIG. 5G in response to an Internet user input on a page displayed by dID app 850. In various embodiments, dID app 850 may be initiated to display a page as illustrated in FIG. 5G in response to the successful validation of the respective Internet user's identifier received by the single IDP (e.g. FIGS. 5A, 5B). In various embodiments, the single IDP automatically generates, and transmits via an API call to dID app 850, a page as illustrated in FIG. 5G, in response to the successful validation of the respective Internet user's identifier received by the single IDP (e.g. FIGS. 5A, 5B). In various embodiments, the single IDP automatically generates, and transmits via an API call to dID app 850, a page as illustrated in FIG. 5G, in response to an API call received from dID app 850.

Figure 5H:
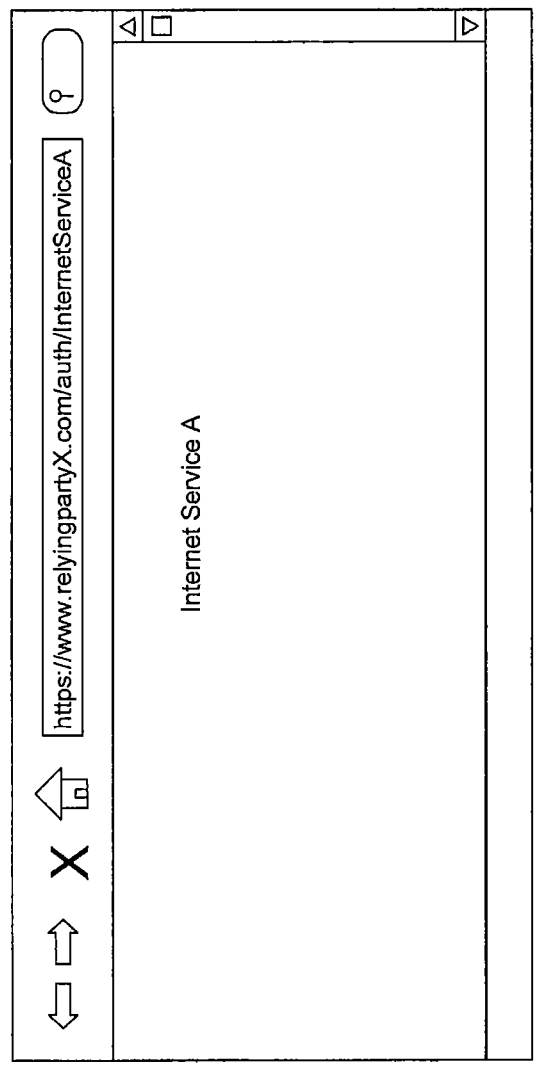

Referring now to FIG. 5H, an illustrative screenshot of an example of an Internet user interface to relying party Internet services according to some embodiments of the present subject matter are provided. In the illustrated embodiments of FIG. 5H, the respective web browser of the respective Internet user is re-directed by the single IDP (150, 250) to a pre-registered call-back Internet address for the respective Internet service of the respective RP in response to the single IDP successfully validating the received approved authentication challenge message transmitted from dID app 850, and the web browser of the respective Internet user displays a web page, such as the web page depicted in the example of FIG. 5H, that indicates the single IDP (150, 250) has authorized access by the respective Internet user to the respective requested Internet service. In various embodiments, in response to successful validation of the received approved authentication challenge message transmitted from dID app 850, the single IDP automatically generates, and transmits to the web browser, a web page such as the web page depicted in the example of FIG. 5H.

The dID Application: Internet User Registration and Management

In various embodiments, the dID Application 850 (e.g. running on Android or iOS or Blackberry OS or MAC OS or Windows) can provide identity registration and management services, authentication token generation and management services, encryption key generation and management services, and authentication services in conjunction with authentication engine 120 of the single IDP. For example, in various embodiments, an Internet user can access the dID app 850 on one or more respective mobile devices (104, 804) or on respective HW devices (106, 804) running the Android, Blackberry OS, MAC OS, or iOS operating system. In some embodiments, upon initial launch of dID app 850, dID app 850 can prompt the Internet user to register for Internet services provided by the single IDP.

Figure 6B:
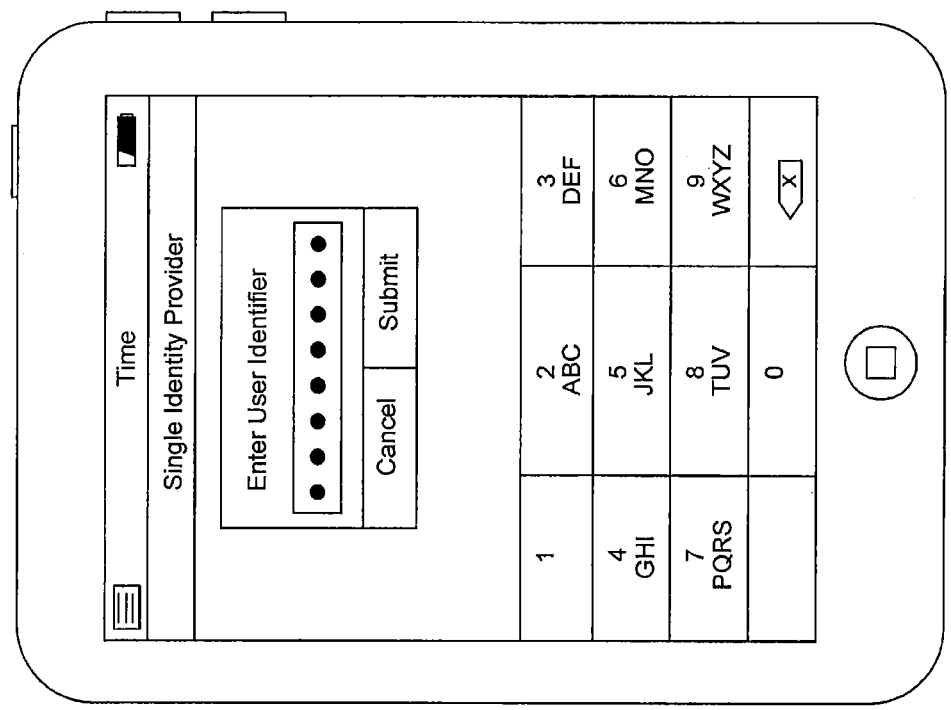
Figure 6C:
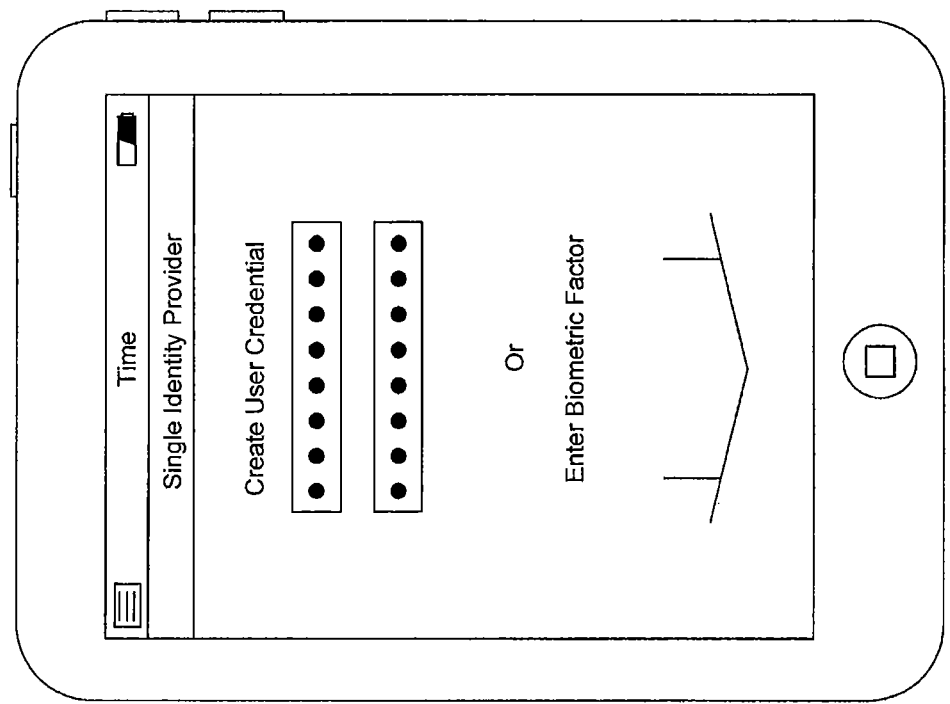

Referring now to FIGS. 6A-6C, illustrative screenshots of examples of Internet user interfaces to dID app 850 residing on an illustrative Internet user device (804, 104, 204) according to some embodiments of the present subject matter are provided. With reference to FIG. 6A, dID app 850 residing on a device (e.g. 804, 104, 106) of the Internet user may be initially launched to display a page to receive an input from an Internet user (e.g. a click (or press, or otherwise activate)) a hypertext (or hot spots, such as buttons, or an image) "Register" or the like on the page. In various embodiments, a computer-implemented process of an Internet user registering for Internet services provided by the single IDP may require, for example, an Internet user's input of registration information such as, for example, one or more of his/her email addresses, his/her first name and last name, on a page displayed via dID app 850. With reference to FIG. 6B, dID app 850 residing on a device (e.g. 804, 104, 106) of the Internet user may display a page to receive an input of an user identifier (e.g. an email address) of the Internet user in response to receiving an Internet user request to register on a page of dID app 850 (e.g. FIG. 6A). In some embodiments, IDP service core 150-N of the single IDP may generate an anonymous identifier for the Internet user N in response to receiving an API call from dID app 850 including electronic signals indicative of Internet user registration information. In various embodiments, a POST is be performed with an appropriate string of Internet user registration data, e.g., JSON data. In some embodiments, IDP service core 150-N of the single IDP may generate an anonymous identifier for the Internet user N in response to receiving an API call from dID app 850 including electronic signals indicative of an Internet user request to register on a page of dID app 850. In some embodiments, IDP service core 150-N of the single IDP may transmit the anonymous identifier to another application (e.g. an electronic mail application, an Internet user account at a website of the single IDP accessible by a web browser application) residing on a device (e.g. 804, 104, 106, 102) of the Internet user in an out-of-band interaction from dID app 850. In some embodiments, dID app 850 may automatically generate an anonymous identifier for the Internet user N in response to receiving an Internet user request to register on a page of dID app 850 (e.g. FIG. 6A) and display the generated anonymous identifier on a page of dID app 850 (not shown).

With reference now to FIG. 6C, dID app 850 residing on a device (e.g. 804, 104, 106) of the Internet user may display a page to receive an input of a user credential (e.g. an Internet user selected personal identification number (PIN) and/or a biometric factor of the Internet user) in response to receiving an Internet user request to register on a page of dID app 850 (e.g. FIG. 6A) or in response to receiving an input of a user identifier from the Internet user on another page of dID app 850 (e.g. FIG. 6B). In some embodiments, dID app 850 residing on a device (e.g. 804, 104, 106) of the Internet user may display a page to receive an input of a user credential in response to receiving an API call from IDP service core 150-N of the single IDP such as, for example, in response to the IDP service core 150-N generation of an anonymous identifier for the Internet user N. In various embodiments, dID app 850 receives an input of a biometric factor via signals received from a biometric identification reader (e.g. fingerprint scanner, camera) configured to read biometric information (e.g. a fingerprint, a facial image) from an Internet user.

Figure 6D:
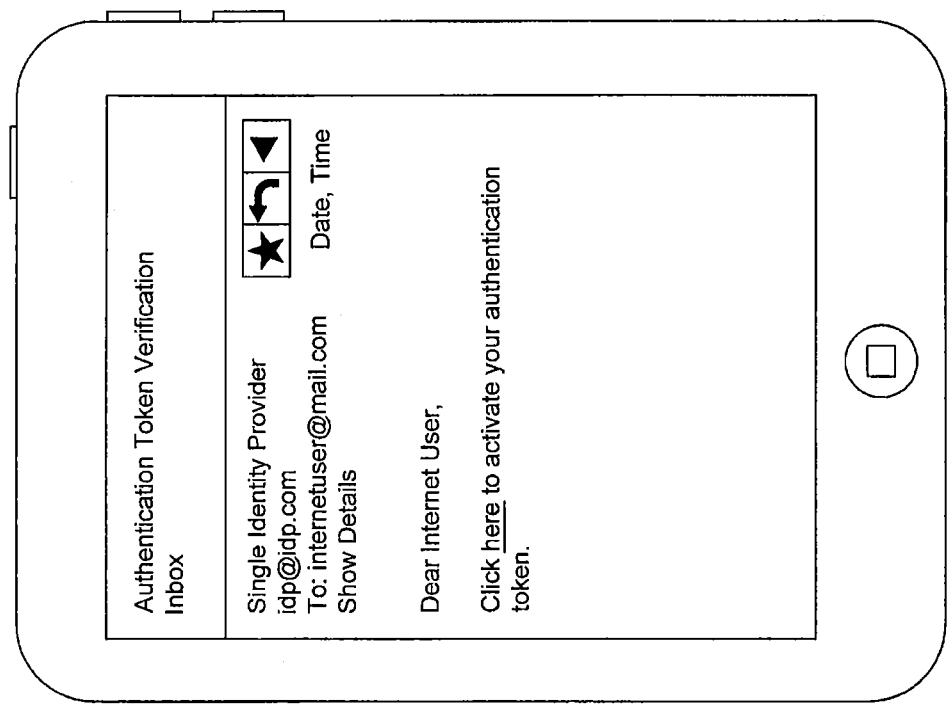

Referring now to FIG. 6D, an illustrative screenshot of an example of an Internet user interface to an application other than the dID app 850 residing on a device (e.g. 804, 104, 106, 102) according to some embodiments is provided. In various embodiments, in an out-of-band interaction from dID app 850, another application residing on a device (e.g. an electronic mail application, an Internet user account at a website of the single IDP accessible by a web browser application) may display a page to receive an input from an Internet user (e.g. a click (or press, or otherwise activate)) a hypertext (or hot spots, such as buttons, or an image) "here" or the like on the page including an active link. In various embodiments, the single IDP service core (150-N, 250-N) may generate the page displayed at the another application residing on a device to activate a dID app 850 created authentication token of the Internet user. In various embodiments, the single IDP service core (150-N, 250-N) may generate the page displayed at the another application residing on a device, and transmit the generated page to the another application in an out-of-band interaction from dID app 850, in response to receiving a public key portion of the dID app 850 created authentication token of the Internet user via an API call from dID app 850. In various embodiments, the single IDP service core (150-N, 250-N) may generate the page displayed at the another application residing on a device to include an active link associated with a pseudorandom activation code generated by the single IDP service core (150-N, 250-N) in response to receiving a public key portion of the dID app 850 created authentication token of the Internet user via an API call from dID app 850.

Figure 6E:
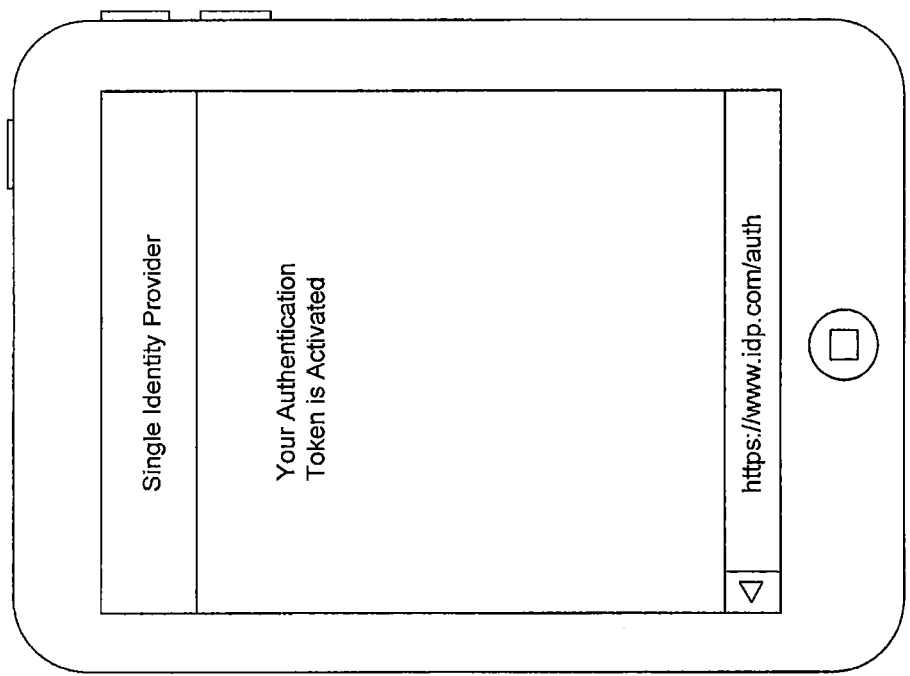

In various embodiments, the generated pseudorandom activation code is usable to activate the dID app 850 created authentication token for the Internet user. In some embodiments, in an out-of-band interaction from dID app 850 with a web browser residing on a device (e.g. 804, 104, 106, 102) of an Internet user, the single IDP service core (150-N, 250-N) may automatically activate the dID app 850 created authentication token in response to receiving a signal from the another application residing on the device indicative of an Internet user's selection of the active link displayed on a page by the another application. With reference to FIG. 6E, an example of a single identity provider (150, 250) website screenshot on a respective web browser of an Internet user device (e.g. 804, 104, 106, 102) according to some embodiments is provided. In the illustrated embodiments of FIG. 6E, the respective web browser of the respective Internet user device is directed to a web page of the website of the single identity provider (150, 250) in response to receiving a signal from the another application residing on the device indicative of an Internet user's selection of the active link displayed on a page by the another application. (e.g. FIG. 6D). In various embodiments, as shown in FIG. 6E, the single IDP service core (150-N, 250-N) may generate the web page displayed at the respective web browser to display a notification to the Internet user that the dID app 850 created authentication token is activated.

In some embodiments, an Internet user can input such registration information using dID app 850 and user interface 110. In various embodiments, an Internet user can input such registration information in an out-of-band interaction from dID app 850 with single IDP service core (150, 250) such as, for example, on the single IDP's website and via an Internet user's web browser on his/her device(s) (804, 104, 106) running dID app 850 and user interface (110, 210). In some embodiments, an Internet user N can input such registration information in an out-of-band interaction from his/her device(s) (804, 104, 106) running dID app 850 with IDP service core (150-N, 250-N) such as, for example, on the IDP service core's (150, 250) website and via a web browser on another one of the Internet user's devices (e.g. 102) and user interface (110, 210). In various embodiments, a computer-implemented process of an Internet user N registering for Internet services provided by the single IDP may involve an Internet user request to register using dID app 850 and, in response to receiving an API call including electronic signals indicative of such request, IDP service core (150-N, 250-N) generating an anonymous identifier for the Internet user N that is unique to the Internet user N. In various embodiments, an Internet user N can input registration information for one or more devices on which dID app 850 resides such as, for example a device identifier (e.g. device name, device PIN, device IMEI, device MIN, device MAC address, device SIM card, etc.). In various embodiments, dID app 850 automatically transmits, via an API call to the IDP service core (150, 250), a device identifier (e.g. device name, device PIN, device IMEI, device MIN, device MAC address, device SIM card, etc.) for the device running the dID app 850 and transmitting Internet user N registration information to the single IDP service core (150-N, 250-N).

In various embodiments, the dID app 850 created authentication token is specific to a user identifier (e.g. an electronic mail address, an anonymous identifier) of the Internet user N, a user credential (a PIN and/or a biometric factor) of the Internet user, a device identifier of one or more devices, and the dID app residing on the one or more devices, where the user identifier, respective device identifier(s), and public key portion of the dID app 850 created authentication token are registered with the single IDP service core (150-N, 250-N). In various embodiments, the dID app 850 created authentication token is specific to a user identifier (e.g. an electronic mail address, an anonymous identifier) of the Internet user N, a user credential (a PIN and/or a biometric factor) of the Internet user N, a device identifier of one or more devices, and the dID app residing on an Internet-user selected one of the one or more devices, where the user identifier, respective device identifier(s), and public key portion of the dID app 850 created authentication token are registered with the single IDP service core (150-N, 250-N). In various embodiments, the dID app 850 created authentication token is also specific to a pseudorandom activation code generated by the single IDP service core (150-N, 250-N), for example, in response to receiving a public key portion of the dID app 850 created authentication token. In various embodiments, single IDP service core (150-N, 250-N) will require dID app 850 to register the Internet user N identifier(s), one or more of the Internet user N device identifier(s), and/or the public key portion of the dID app 850 created authentication token, if they do not already exist in the single IDP identity repository (140, 240), with single IDP service core (150-N, 250-N). In various embodiments, dID app 850 is usable to create a different authentication token for an Internet user that has already registered information existing in the single IDP identity repository (140, 240), but that is specific to, for example, a different user identifier (e.g. electronic mail address) for the Internet user and to register the different user identifier, device identifier(s), and public key portion of the different authentication token with single IDP service core (150-N, 250-N).

In some embodiments, during registration, authentication engine 120 (220) of IDP service core (150, 250) can validate that the registering Internet user controls the user identifier (e.g. electronic mail address) provided during an initial registration step via an out-of-band from dID app 850 confirmation process. In various embodiments, for example, IDP service core (150, 250) can send a generated page of an electronic mail or other communication (e.g. text message, SMS message, page, etc.) to an application other than dID app 850 to display identity information provided by the Internet user (e.g. e-mail address, phone number, pager number), and provide instructions for the Internet user to respond and/or to confirm the registration information (e.g. e-mail address) initially supplied by the Internet user using the application other than dID app 850. In various embodiments, IDP service core (150, 250) of the single IDP can store single IDP registered Internet user's identity information (e.g. user identifier (e.g. email address(es), anonymous identifier), first name, last name, etc.), and/or single IDP registered Internet user device(s)' identity information (e.g. device identifier(s)) in identity repository (140, 240) of the single IDP. In various embodiments, IDP service core (150, 250) can validate that the registering Internet user controls the registering Internet user device that transmitted the user registration request. In various embodiments, for example, IDP service core (150, 250) can send a message requesting and requiring registration confirmation to the Internet user device (804, 104, 106) based on device identifier(s) (e.g. device name, device PIN, device INTEL device MIN, device MAC address, device SIM card, etc.) received during the registration process. In various embodiments, Internet users can manage the identity information stored in identity repository (140, 240) of the single IDP, including by updating the registered identity information (e.g. name) and/or the registered Internet user identifier (e.g. electronic mail address) with authentication engine (120, 220) of the single IDP via user interface (110, 210), deletion of some or all of their registered identifying information via user interface (110, 210), revocation of devices (e.g. if a user device upon which dID app 850 resides is lost, destroyed, or stolen) and/or registered identity information via user interface (110, 201) and/or dID app 850 (described in more detail below), denying registration confirmation requests, etc. In various embodiments, IDP service core (150, 250) of the single IDP may automatically suspend and/or revoke a registered device upon receiving an indication that the device has been lost, stolen, destroyed, or compromised and such that all approved authentication challenge messages sent from the dID app 850 residing on such device, and such device itself, are automatically repudiated.

The dID Application: Authentication Token Generation and Management

In various embodiments, after an Internet user registers and/or validates his/her, and/or his/her device's, identity information with authentication engine (120, 220) of the single IDP, the dID app 850 may generate an authentication token including an asymmetric key pair (private key portion and corresponding public key portion) using a cryptographically secure algorithm. In various embodiments, the dID app 850 generated authentication token is specific to a user identifier (e.g. an electronic mail address, an anonymous identifier) of the Internet user N, a user credential (a PIN and/or a biometric factor) of the Internet user, a device identifier of one or more devices, and the dID app residing on the one or more devices, where the user identifier, respective device identifier(s), and public key portion of the dID app 850 created authentication token are registered with the single IDP service core (150-N, 250-N). In various embodiments, IDP service core (150-N, 250-N) of the single IDP may require dID app 850 to generate an authentication token. In various embodiments, during registration, dID app 850 may prompt the Internet user to choose and validate a personal identification number (PIN) and/or submit one or more biometric factors (e.g. fingerprint, facial image, etc.). In various embodiments, an Internet user's PIN for his/her dID app 850 generated authentication token may include at least numbers, letters or symbols, or combinations thereof.

In various embodiments, the private key portion of the dID app 850 generated authentication token is bound to a user credential (e.g. an Internet user selected personal identification number (PIN) and/or Internet user biometric factor). For example, if the dID app 850 generated authentication token is bound to an Internet user biometric factor, the Internet user may be prompted by dID app 850 to enter a biometric factor in addition to submitting his/her PIN (e.g. FIG. 6C, 5E) during initial registration and during authentication challenges. In some embodiments, dID app 850 may interface with internal and/or external components (not shown) of device (804, 104, 106) such as, for example, a camera, fingerprint sensor, or other sensor of device (804, 104, 106), and/or a sensor in communication with device (804, 104, 106). In various embodiments, the biometric factor may be sequenced and/or processed by the dID app 850. In various embodiments, the private key portion of the dID app 850 generated authentication token is bound to a combination of a user credential and a pseudorandom string generated by the single IDP service core (150-N, 250-N) and transmitted to dID app 850 in an API call. In various embodiments, the private key portion of the dID app 850 generated authentication token is bound to a combination of a user credential, a pseudorandom string generated by the single IDP service core (150-N, 250-N) and transmitted to dID app 850 via an API call, and a device identifier (e.g.

device name, device PIN, device IMEI, device MIN, device MAC address, device SIM card, etc.) of the device upon which dID app 850 resides.

In various embodiments, such as for example where the OS of a user device (804, 104, 106) includes an OS and hardware controlled key store (e.g. iOS), cryptographic component 820 of dID app 850 can generate an authentication token (asymmetric key pair (e.g. public key portion and corresponding private key portion)) using the hardware controlled key store, encrypt the private key portion of the generated authentication token using the Internet user's user credential and the hardware controlled key store, and store the encrypted private key in memory 840 on device (804, 104, 106). In various embodiments, such as for example where the OS of a user device (804, 104, 106) includes an OS without a hardware controlled key store (e.g. Android, Blackberry OS), cryptographic component 820 of dID app 850 can generate an authentication token (asymmetric key pair (e.g. public key portion and corresponding private key portion)) using a cryptographically secure algorithm, use the user credential, or user credential combination, to generate a cryptographically secure encryption key (e.g. use the user credential, or user credential combination, as a seed to an AES encryption algorithm to generate an AES-256 encryption key), encrypt the private key portion of the generated authentication token using the generated encryption key, and store the encrypted private key in memory 840 on device (804, 104, 106). In various embodiments, cryptographic component 820 of dID app 850 can use a sequenced biometric factor, or for example a biometric factor identifier, in encrypting, or generating the encryption key for encrypting, the private key portion of the generated authentication token.

In various embodiments, dID app 850 transmits the public key portion of the generated authentication token via an API call to the IDP service core (150-N, 250-N) of the single IDP. In various embodiments, the cryptographic component 820 of the dID app 850 encrypts the public key portion of the generated authentication token, using for example a network security protocol such as Secure Socket Layer (SSL) or Transport Layer Security (TLS). In various embodiments, the cryptographic component 820 of the dID app 850 may create a binding to link the public key portion of the generated authentication token to an instance of the dID app 850, and/or the device (704, 104, 106) upon which the dID app 850 resides. In some embodiments, the cryptographic component 720 of dID app 850 may generate a temporary symmetric transport key pair to encrypt the public key portion of the generated authentication token and created binding (e.g. error correction code, cryptographic hash) for transmission from the device (704, 104, 106) to the IDP service core (150-N, 250-N) of the single IDP. In some embodiments, dID app 750 may display the temporary symmetric transport key generated by cryptographic component 820 to the user on a display (not shown) of device (804, 104, 106). In various embodiments, dID app 850 transmits this encrypted public key portion and binding to the IDP service core (150, 250) via transceiver 810 of device (804, 104, 106). In various embodiments, to complete a key exchange of the dID app 850 generated temporary symmetric transport key, dID app 850 directs a web browser of the device (804, 104, 106) to a website of the single IDP, and where the Internet user can, for example, manually enter the generated temporary symmetric transport key during an Internet user-IDP service core (150, 250) interaction separate (e.g. out-of-band) from dID app 850 using user interface (110, 210).

In some embodiments, the information sent between a web browser (e.g. of device 804, 102, 104, 106), and/or dID app 850, and the IDP service core (150, 250) is encrypted using a network security protocol such as, for example, Secure Socket Layer (SSL) or Transport Layer Security (TLS). In various embodiments, the IDP service core (150, 250) receives the public key portion of the generated authentication token via an API call from dID app 850. In some embodiments, authentication engine (120, 220) of IDP service core (150, 250) decrypts the received encrypted public key portion using SSL or TLS or the symmetric transport key provided by the web browser of the Internet user such as, for example, in an out-of-band Internet user-IDP service core interaction. In various embodiments, the IDP service core (150, 250) stores the received public key portion of the dID app 850 generated authentication token in identity repository 140. In various embodiments, the IDP service core (150, 250) may store the received public key portion of the dID app 850 generated authentication token and binding in identity repository 140. In various embodiments, the IDP service core (150, 250) stores the received public key portion of the dID app 850 generated authentication token in identity repository 140 in a cryptographically secure manner (e.g. encrypted, digitally signed, etc.)

In various embodiments, the authentication engine 120 (220) of IDP service core (150, 250) may generate a binding between the received public key portion of the dID app 850 generated authentication token, Internet user information (e.g. user identifier), and/or device information (e.g. device identifier) via cryptographic methods such as, for example, generating a cryptographic hash of an Internet user N identifier, the received public key portion of the dID app 850 generated authentication token, and/or a device identifier (804, 104, 106) and may coordinate storage of the generated binding and the received public key portion of the dID app 850 generated authentication token in a repository such as, for example, identity repository 140. In various embodiments, the authentication engine (120, 220) of the single IDP may validate an Internet user's requests for access to RP Internet services provided by a RP (160-i, 260-i) with the stored received public key portion of the dID app 850 generated authentication token, and/or binding, in the identity repository 140. In various embodiments, authentication engine (120, 220) can generate a binding to ensure that no changes have been made (e.g. ensure data integrity) to the stored user identity information (e.g. user identifier), received public key portion of the dID app 850 generated authentication token, device (804, 104, 106) information (e.g. device identifier), etc.

In various embodiments, an Internet user can use dID app 850 to register with the IDP service core (150, 250) of the single IDP and generate a plurality of different authentication tokens (e.g. different asymmetric key pairs), for different purposes and/or increased levels of assurance. For example, an Internet user can use dID app 850 to register with IDP service core (150, 250) of the single IDP and generate different authentication tokens using dID app 850 and using respectively different Internet user registration information such as, for example, different pseudonyms and different user identifiers (e.g. e-mail addresses) and/or different device identifiers such that the dID app 850 transmits and registers each different public key portion of each different dID app 850 generated authentication token to the IDP service core (150, 250) of the single IDP. In various embodiments, dID app 850 and the IDP service core (150, 250) of the single IDP may permit the Internet user to register more than one user identifier (e.g. more than one electronic mail address, an anonymous identifier and an electronic mail address), and more than one device identifier, such that the dID app 850 generated authentication token is specific to the registered more than one user identifier, the registered more than one device identifier, the user credential of the Internet user, and dID app 850. In some embodiments, a master dID app 750 residing on a pre-registered device 704 generates an authentication token that is also specific to slave dID applications residing on each of one or more additional pre-registered devices (e.g. 102, 104, 106).

In various embodiments, dID app 850 may receive a new pseudorandom string at a predetermined periodicity (e.g. after a predetermined number of authentications, after the expiration of a predetermined period of time, after the expiration of a predetermined amount of time from the last authentication) and via an API call from IDP service core 150 of the single IDP. In various embodiments, cryptographic component 820 of dID app 850 can generate a new cryptographically secure encryption key, for example, using each received new pseudorandom string and the user credential of the Internet user, encrypt the private key portion of the generated authentication token using the generated new encryption key, and store the newly encrypted private key in memory 840 on device (804, 104, 106). In various embodiments, in response to dID app 850 receiving a new pseudorandom string from IDP service core 150 of the single IDP, dID app 850 may generate and display a page requiring the Internet user to input a user credential (e.g. FIG. 5E), and use the user credential to decrypt the stored private key portion of the prior created authentication token as described above. In various embodiments, in response to dID app 850 receiving a new pseudorandom string from IDP service core 150 of the single IDP and a successful decryption, dID app 850 may also generate and display a page requiring the Internet user to create a new user credential (e.g. FIG. 6C), cryptographic component 820 of dID app 850 may generate a new cryptographically secure encryption key using the received new pseudorandom string and the received new user credential of the Internet user as described above, encrypt the private key portion of the generated authentication token using the generated new encryption key, and store the newly encrypted private key in memory 840 on device (804, 104, 106).

In various embodiments, dID app 850 may periodically create a new authentication token (e.g. after a predetermined number of authentications, after the expiration of a predetermined period of time, after the expiration of a predetermined amount of time from the last authentication). In various embodiments, in response to the creation of the new authentication token, dID app 850 may generate and display a page requiring the Internet user to input a user credential (e.g. FIG. 5E), and use the user credential to decrypt the stored private key portion of the prior created authentication token as described above. In various embodiments, in response to a successful decryption, dID app 850 may delete the stored private key portion of the prior created authentication token, encrypt the private key portion of the new created authentication token using the user credential as described above, and store the encrypted private key portion of the new created authentication token in memory 840 on device (804, 104, 106). In various embodiments, in response to a successful decryption, dID app 850 may also generate and display a page requiring the Internet user to create a new user credential (e.g. FIG. 6C), cryptographic component 820 of dID app 850 may generate a new cryptographically secure encryption key using the received new user credential of the Internet user as described above, encrypt the private key portion of the generated authentication token using the generated new encryption key as described above, and store the newly encrypted private key in memory 840 on device (804, 104, 106). In various embodiments, dID app 850 transmits the public key portion of the new created authentication token via an API call to the IDP service core (150-N, 250-N) of the single IDP. In various embodiments, dID app 850 may receive a new pseudorandom string via an API call from IDP service core 150 (150-N, 250-N) of the single IDP in response to the IDP service core 150 (150-N, 250-N) receiving the public key portion of the new created authentication token.

The RP Internet Services, IDP Service, and dID App: Authentication

In various embodiments, once an Internet user registers with IDP service core (150, 250) and dID app generates an authentication token, an Internet user can use dID app 750 to authenticate to RP Internet services of RPs (160-i, 260-i) (e.g. Internet services accessed via an RP website) with which each RP (160-i, 260-i) has pre-registered with the single IDP. In various embodiments, an Internet user may register with a respective one or more RP Internet services at each of one or more RPs (160, 260) at the respective one or more RP Internet services' websites via user interface (110, 201). For example, an Internet user may register with two or more RPs (160, 260) (e.g. Facebook®, Amazon®) and indicate, during or after registration, that he/she desires to use identity provider services of the single IDP to authenticate to the RPs and to be authorized access to a respective one or more RP Internet services of each of the RPs. In some embodiments, for example in embodiments where dID app 850, the IDP service core (150, 250) of the single IDP and a respective one or more RP Internet services (160-i, 260-i) of RPs are bound and dedicated to each other, an Internet user can use dID app 850 to authenticate to the respective one or more RP Internet services of each RP to which dID app 850 and the IDP service core (150, 250) are bound. In various embodiments, authentication requests are initiated from the respective RP Internet service of the respective RP (160-i, 260-i) as described herein, and brokered by the Identity Provider service (150, 250) as described herein.

Referring now to FIGS. 4A-5H and 7, a flow chart illustrating a computer-implemented method for authorizing respective access by each of a plurality of Internet users to a respective one or more Internet services provided by each of a plurality of Internet service providers, and illustrative screenshots of examples of Internet user interfaces to relying party Internet services, to single identity provider Internet services, and to an identity provider application residing on a device, according to some embodiments are provided. In various embodiments, at block 722, an Internet user (e.g. via his/her device 704) visits an RP Internet service provider's 760 website, such as a website of Facebook®. The user may access the RP Internet service provider's 760 website a number of ways (e.g., the user's entrance into the RP Internet service provider's 760 website may be "path sensitive" such as via a public network, via a link from another account the customer may have with the RP Internet service provider, via a notice or alert sent to the customer by the RP Internet service provider, via an e-mail advertisement sent to the user by the RP Internet service provider, in response to a receipt of a promotional advertisement, etc.) For example, at block 724 (FIGS. 4A-4B), a respective RP Internet service provider 760 can present a dID app 750 authentication option to access a respective one or more of the Internet services provided by the respective Internet service provider 760 to the Internet user on an appropriate screen in the graphical user interface (GUI) (FIGS. 4A-4B) of a web browser 710 of device 704 of the Internet user that is displayed by the website. Examples of such screens are shown at FIGS. 4A-4B.

As shown in the example graphical user interfaces (GUI) of FIGS. 4A-4B, and at block 724, the RP Internet service provider's 760 website may present the Internet user with a web page displaying a plurality of links where each link is associated with a respective Internet service provided by the respective Internet service provider 560. In some embodiments (not shown), at block 524, the RP Internet service provider's 760 website may present the user with a prompt to securely login with the single IDP by entering text at the prompt including the Internet user's identifier (e.g. email address or anonymous identifier) registered with the IDP service core 750 of the single IDP. In some embodiments (not shown), as the Internet user enters text at the secure login prompt displayed on the web page of the RP Internet service provider's 760 website, an entry may be auto-completed based on matching information stored at an RP service provider's 760 database (not shown).

At block 726, the Internet user indicates his/her desire to access a respective one Internet service provided by the respective RP by making a selection of the appropriate link displayed on the Relying Party (e.g. "X"'s, FIGS. 4A, 4B) web page using a suitable input device as described above. In some embodiments (not shown), at block 726, the Internet user indicates his/her desire to authenticate to access respective Internet services provided by the respective RP by entering Internet user's identifier (e.g. email address or anonymous identifier) registered with the IDP service core 750 of the single IDP and chooses a dID app login option by, for example, pressing (or clicking, or otherwise activating) an "authentication" icon (or other suitable hypertext, image, hot spot, etc.). In some embodiments, the display at block 724, and/or user entry at block 726, are optional, and the RP Internet service provider's website may be pre-configured to indicate an Internet user's selection of an Internet service provided by the RP Internet service provider when the Internet user enters an Internet address to access the Internet service of the RP Internet service provider in the web browser 710.

Based on the Internet user's selection, or pre-configuration for the Internet address to access the Internet service of the RP Internet service provider 760, at block 728, an association session is initiated between the RP Internet service provider 760 and the IDP service core 750. At block 728, the RP Internet service provider 760 transmits an API call (e.g. a GET or POST request) including the respective unique Internet service identifier (e.g. uniquely generated pseudorandom string), generated by IDP service core 750 for the selected Internet service during registration, and a call back Internet address (e.g. URL) pre-registered with IDP service core 750, to the IDP service core 750. At block 732, in response to the respective Internet user's selection of a respective link displayed on the respective RP's web page (e.g. FIGS. 4A, 4B) that identified a respective Internet service provided by the RP and the RP's transmission of the respective RP service identifier and the web browser identifier, the IDP service core 750 directs the Internet user's web browser 710 to the website of the single IDP that is operatively coupled to IDP service core 750, and, as shown in FIGS. 5A and 5B, the IDP service core 750 presents an appropriate web page in the graphical user interface (GUI) of a device 704 in the web browser 710 user that requires dID app 750 Internet users to provide an input of an Internet user identifier (e.g. an electronic mail address, an IDP service generated anonymous identifier) into the web browser 710 of the device.

At block 734, the dID app 750 Internet user provides an input of his/her Internet user identifier via web browser 710 and using a suitable input device as described above, and the web browser generates and transmits an electronic signal indicative of the Internet user identifier received from the Internet user input. In some embodiments, the direction at block 732, and Internet user entry at block 734, are optional, and an Internet user's user identifier may be pre-configured to be sent to the IDP service core 750 when the Internet user enters the Internet user identifier at the RP service provider's 160 (260) website. In various embodiments, the IDP service core 750, may require the Internet user's web browser 710 to direct to a web page that indicates that the Internet user's request is cancelled, and/or the Internet user's account with the single IDP is locked, for example, after expiration of a predetermined amount of time or a predetermined number of invalid entries.

At block 736, authentication engine (120, 220) of IDP service core 750 processes the received Internet user identifier and the received respective RP service identifier, validates the received Internet user identifier against stored data in identity repository (140, 240), retrieves a stored visually perceptible identifier of the RP (e.g. FIG. 5C RP name ("Relying Party X", RP image (key hole image)), and a stored Internet address of a respective web page belonging to the RP (e.g. FIG. 5C "https://www.relyingpartyX.com/IntemetServiceA"), from identity repository (140, 240), generates a verification code (e.g. FIG. 5C "IUZ23"), generates a pending authentication challenge web page including such data and transmits the web page to the web browser 710 of a device 704 that displays, as shown in the example of FIG. 5C, the visually perceptible identifier of the RP, the respective Internet address of the respective web page belonging to the RP, a notification to the Internet user, and the generated verification code. In various embodiments, information provided on the pending authentication challenge web page is displayed to the Internet user to allow the Internet user to visually verify such information on the pending authentication challenge web page. For example, the Internet user may compare the information displayed on the pending authentication challenge web page to his/her knowledge from providing the inputs to request access to the respective Internet service provided by the RP. The inventors have observed that in using various embodiments of the systems and methods described herein, the generation and display of a pending authentication challenge web page (e.g. FIG. 5C) to the Internet user on a web browser 710 of a device 704 benefit the RPs, single IDP, and Internet users, by reducing the vulnerability of an unauthorized third party attempting to concurrently mimic the authentication that the Internet user is attempting to complete. In various embodiments, an Internet user can choose to reject an authentication request and relay that information to IDP service core 750 using dID app 750 and/or web browser 710. In some embodiments, if an authentication request is cancelled by an Internet user, the web browser (e.g. 710) is directed to a failed authentication page.

In various embodiments, once an authentication request has been initiated by an RP server 760 and brokered by IDP service core 750, authentication engine (120, 220) may generate and transmit a page, and/or an update to a page, to dID app 750 to notify the Internet user of the pending and completed authentication challenges for the received user identifier. In some embodiments, the notification page is set by, for example, an administrator (not shown), for IDP service core 750, and updated using information provided by authentication engine (120, 220). For example, the updated notification page indicating that a new authentication challenge has been initiated by an RP Internet service provider (160-i, 260-i, 760) for a respective Internet service of the RP and brokered by IDP service core 750 for the received user identifier may be delivered through the Android Cloud Messaging framework if dID app 750 is running on an Android OS on device 704, or delivered leveraging Apple's Push Notification framework if dID app 750 is running on iOS on device 704.

As shown in the example of FIG. 5G, dID app 750 residing on a device 704 of the Internet user may display a notification page that displays a plurality of respective visually perceptible identifiers of respective RPs 160-i, respective Internet addresses of respective web pages belonging to the respective 160-i, a date identifier, a time identifier, respective verification codes generated by the single IDP, and respective status identifiers of authorizing respective access by the respective Internet user to the respective requested Internet services provided by the respective RPs. In various embodiments, information provided on the notification page is displayed to the Internet user to allow the Internet user to visually verify such information on the notification page. For example, the Internet user may compare the information displayed on the notification page to his/her knowledge from providing the inputs to request access to the respective Internet service provided by the RP. The inventors have observed that in using various embodiments of the systems and methods described herein, the generation and display of a notification page (e.g. FIG. 5G) to the Internet user on dIDapp 750 of a device 704, as well as the generation and display of a pending authentication challenge web page (e.g. FIG. 5C) to the Internet user on a web browser 710 of a device 704, benefit the RPs, single IDP, and Internet users, by reducing the vulnerability of an unauthorized third party attempting to concurrently mimic the authentication that the dID app 750 user is attempting to complete.

In various embodiments, dID app 750 stores recent (un-archived) authentication requests in memory 740. In various embodiments, IDP service core 550 stores such recent (un-archived) authentication requests for various users in one or more data repositories (not shown). In some embodiments, the notification page of dID app 750 displays a list (including information such as a respective visually perceptible identifier of each RP and/or each requested RP Internet service 560, the respective date/time (e.g. a date/time stamp) of each authentication request and a status of each authentication request (e.g. Pending, Approved, Canceled, Timed-Out)) of recent (un-archived) authentication requests, including the authentication request acted on most recently by dID app 750. In various embodiments, dID app 750 may request this list from IDP service core 550. For example, dID app 750 may use a GET call to check the status of an authentication request. A return value of "Canceled" in this case may indicate that the Internet user, dID app, IDP service core 550, or RP, has rejected the Internet user's request to access a requested RP Internet service 560. A return value of "pending" may indicate that the Internet user, dID app, IDP service core 550, or RP, has not yet approved or rejected the Internet user's access request. A return value of "approved" may indicate that the Internet user has been granted the requested access. In various embodiments, an Internet user may request dID app 750, and/or an appropriate program operating on a computer interacting with a device running dID app 750, to archive one or more items on a list of recent (un-archived) authentication requests received from IDP service core 750. In some embodiments, dID app 750 generates and displays the list on an appropriate screen in the GUI of a device (e.g. 704) of a user to allow the user to see any unauthorized authentication requests that may have occurred when he/she was away from his/her device or unable to review the authentication challenge request notification. In various embodiments, dID app may use a GET call to obtain a list of recent authentication requests for an Internet user's account. The IDP service core 550 may return a JSON list of authentication request structures which may, for example, include fields such as, but not limited to, RP 160-i identifier (visually perceptible identifier of RP 160-i), RP 160-i Internet address (Internet address of web page belonging to the RP 160-i), date (date on which the authentication request was made), time (time at which the authentication request was made), VerificationCode, and StatusId (status identifier of authorizing access by the Internet user to the requested Internet service provided by the RP 160-i) as shown in FIG. 5G. In some embodiments, these GET calls may utilize query parameters or other ways to allow the caller to control what authentication requests are returned. For example, a count parameter may be used to control the number of authentication requests to return, a startAfter parameter may specify which page of results should be returned, and a direction parameter may be used to specify whether earlier authentication requests or later authentication requests are returned. In various embodiments, a displayed list can show when (e.g. date/time) an Internet user launched dID application 750, such as, for example, from dID application's 750 icon in the operating system on the Internet user's device 704. In various embodiments, authentication engine (120, 220) may generate and transmit a notification page, and/or an update to a notification page, to the master dID app 750 and slave dID applications on each of the pre-registered devices to notify the Internet user of the pending and completed authentication challenges for the received user identifier. In some embodiments, authentication engine (120, 220) may generate and transmit a notification page, and/or an update to a notification page, to the master dID app 750 and a pre-selected slave dID application on the corresponding pre-registered devices to notify the Internet user of the pending and completed authentication challenges for the received user identifier. In various embodiments, an Internet user can choose to reject an authentication request and relay that information to IDP service core 750 using dID app 750 and/or web browser 710. In some embodiments, if an authentication request is cancelled by an Internet user, the web browser (e.g. 710) is directed to a failed authentication page. In various embodiments, if an authentication request is cancelled by an Internet user, dID application 750 refreshes a GUI of the user's device (e.g. 704) to a list of recent, un-archived authentication requests.

At block 738, IDP service core 750 requires dID app 750 on device 704 to display, as shown in the example of FIG. 5E, a page to receive an input of a user credential of the Internet user (e.g. PIN, biometric factor, combination thereof) in response to the successful validation of the respective Internet user's identifier received by the single IDP service core at block 734. In various embodiments, single IDP core service 750, at block 538, requires the dID app 750 to display the page to input the Internet user credential. At block 542, dID app 750 validates the received user credential. In various embodiments, dID app 750 receives an input of the user credential from the page displayed by the dID app 750 and validates the received user credential by temporarily decrypting the stored encrypted private key portion of the authentication token. In various embodiments, such as for example where the OS of a user device 704 includes an OS and hardware controlled key store (e.g. iOS), cryptographic component 820 of dID app 750 can validate the received user credential by temporarily decrypting the stored encrypted private key portion of the authentication token using the received user credential and the hardware controlled key store. In various embodiments, such as for example where the OS of a user device (804, 104, 106) includes an OS without a hardware controlled key store (e.g. Android, Blackberry OS), cryptographic component 820 of dID app 750 can validate the received user credential by using the received user credential to generate a cryptographically secure decryption key (e.g. use the received user credential as a seed to an AES encryption algorithm to generate an AES-256 encryption key), and by temporarily decrypting the stored encrypted private key portion of the authentication token using the newly generated decryption key. In various embodiments, cryptographic component 820 of dID app 750 can use a sequenced biometric factor, or for example a biometric factor identifier, in decrypting, or generating the decryption key for decrypting, the stored encrypted private key portion of the authentication token. If the validation fails, dID app 750 can generate a page to provide an appropriate indication to the Internet user, and/or generate and transmit a message to provide an appropriate indication to the IDP service core 750, that the authentication attempt has failed. In various embodiments, in response to the successful validation of the received user credential, dID app 750 increments a counter value stored in memory (e.g. 840) of device 804.

In various embodiments, in response to the successful validation of the received user credential, and as shown in the example of FIG. 5F, dID app 750 residing on the device 704 may display a page that displays a visually perceptible identifier of the RP 560 (e.g. RP name ("Relying Party X", RP image (key hole image)) (e.g. FIGS. 5C, 5D), an Internet address of a web page belonging to the RP 560 (e.g. "https://www.relyingpartyX.com/InternetServiceA") (e.g. FIGS. 5C, 5D), a date identifier (e.g. the date (e.g. "Nov. 31, 2014" of the Internet user's selection of a link displayed on the RP's web page (e.g. FIGS. 4A, 4B)), a time identifier (e.g. the time (e.g. "10:28:49 AM EDT" of the Internet user's selection of a link displayed on the RP's web page (e.g. FIGS. 4A, 4B)), and a verification code generated by the single IDP (e.g. "IUZ23") (e.g. FIGS. 5C, 5D) and requires an input (e.g. selection of "Accept" or selection of "Reject") from the Internet user to generate and/or transmit an approved authentication challenge message via an API call to IDP service core 750. As shown in the example screenshot of FIG. 5F, an Internet user may select to "Accept" or "Reject" the authentication request by, for example, pressing (or clicking, or otherwise activating) an appropriate "Accept" or "Reject" icon (FIG. 5F) (or other suitable hypertext, image, hot spot, etc.). If the Internet user elects to "Reject" the authentication request (e.g. because any of the displayed information is incorrect), the IDP service core 750 may inform the Internet user that the authentication request is cancelled by any appropriate method including, for example, by displaying an error message, or a failed authentication page, in the GUI of device 704 by dID app 750. If the Internet user elects to authorize the authentication request (e.g. because all of the displayed information is correct), the method will proceed to block 742.

At block 742, dID app 750 generates an approved authentication challenge message by digitally signing a predefined pseudorandom string (e.g. a predefined string of text including the verification code received in the pending authentication challenge web page and notification page, timestamp that the string was generated, a counter value stored, in memory (e.g. 840) of the device 704, and/or text) with the decrypted private key portion of the authentication token. At block 742, dID app 750 transmits, via an API call (e.g. a GET or POST request) to the IDP service core 750, the generated approved authentication challenge message. In various embodiments, dID app 750 transmits the predefined string of text and signature to the IDP service core 750 without further encryption. In various embodiments, dID app 750 encrypts the predefined string of text and signature, using, for example a network security protocol such as Secure Socket Layer (SSL) or Transport Layer Security (TLS), and transmits the encrypted predefined string of text and signature to IDP service core 750.

At block 744, authentication engine 120 (220) of IDP service core 750 validates the received approved authentication challenge message (e.g. signed pre-defined string of text) with the public key portion stored in identity repository (140, 240) for the dID app 750 generated authentication token and, in response to the successful validation of the received approved authentication challenge message, and as shown in the example of FIG. 5G, IDP service core 750 re-directs the web browser to a pre-registered call-back Internet address of (e.g. stored in identity repository (140, 240) for the registered RP and the registered, requested Internet service of the registered RP), and displaying content of, a web page belonging to the RP where the web page displayed by the web browser 710 is usable by the Internet user to access the requested Internet service provided by the RP. In various embodiments, in response to the web browser 710 re-directing to the respective call-back Internet address, dID app 750 increments the counter value stored in memory (e.g. 840) of device 804. In various embodiments, identity repository (140, 240) stores a respective counter value associated with each authentication token generated by dID app 750. In various embodiments, IDP service core 750 validates the received approved authentication challenge message using the public key portion, and the counter value, stored in identity repository (140, 240) for the dID app 750 generated authentication token. In various embodiments, in response to validating the received approved authentication challenge message, IDP service core 750 increments the counter value in the stored data of identity repository (140, 240) for the authentication token generated by dID app 750.

At block 746, authentication engine 120 (220) of IDP service core 750 may repudiate the received approved authentication challenge message (e.g. signed pre-defined string of text) with the public key portion stored in identity repository (140, 240) for the authentication token generated by dID app 750 and, in response to the repudiation of the received approved authentication challenge message, the IDP service core 750 denies access by the Internet user to the respective Internet service provided by the RP 560 by directing the web browser 710 to an Internet address of the single IDP that notifies the Internet user of the denied access. In various embodiments, IDP service core 750 may repudiate the received approved authentication challenge message using the public key portion, and the counter value, stored in identity repository (140, 240) for the dID app 750 generated authentication token. In various embodiments, in response to repudiating the received approved authentication challenge message, IDP service core 750 may restart the counter value in the stored data of identity repository (140, 240) for the authentication token generated by dID app 750. In various embodiments, in response to repudiating the received approved authentication challenge message, IDP service core 750 may automatically require dID app 750 to generate a new authentication token upon receiving the next subsequent API call from dID app 750. If the authentication engine 120 (220) of IDP service core 750 repudiates the received approved authentication challenge message, IDP service core 750 may send an appropriate notification to RP server 760.

In various embodiments, upon successful validation of the received approved authentication challenge message, IDP service core 750 generates a validation token using pre-registered information stored in identity repository (140, 240) for the registered RP and the registered, requested Internet service of the registered RP (e.g. an Internet service identifier, an Internet service secret, and/or combinations thereof), and re-directs the user to the pre-registered callback Internet address with the validation token. At block 748, RP server 760 sends a validation token validation request to IDP service core 750 that includes the validation token included in the callback URL. In various embodiments, RP server 760 sends the validation token validation request via Open ID Connect protocol communications. At block 752, authentication engine (120, 220) of IDP service core 750 validates the received validation token and, if successfully validated, IDP service core 750 sends a token validation message to RP server 560. In various embodiments, IDP service core 750 sends the token validation message via Open ID Connect protocol communications. If the received validation token is not successfully validated, IDP service core 750 can send an appropriate notification to RP server 760. At block 754, the Internet user is granted access to the requested Internet service provided by the RP and RP server 760 initiates an authenticated session with the user's web browser to provide such Internet service.

Figure 9:
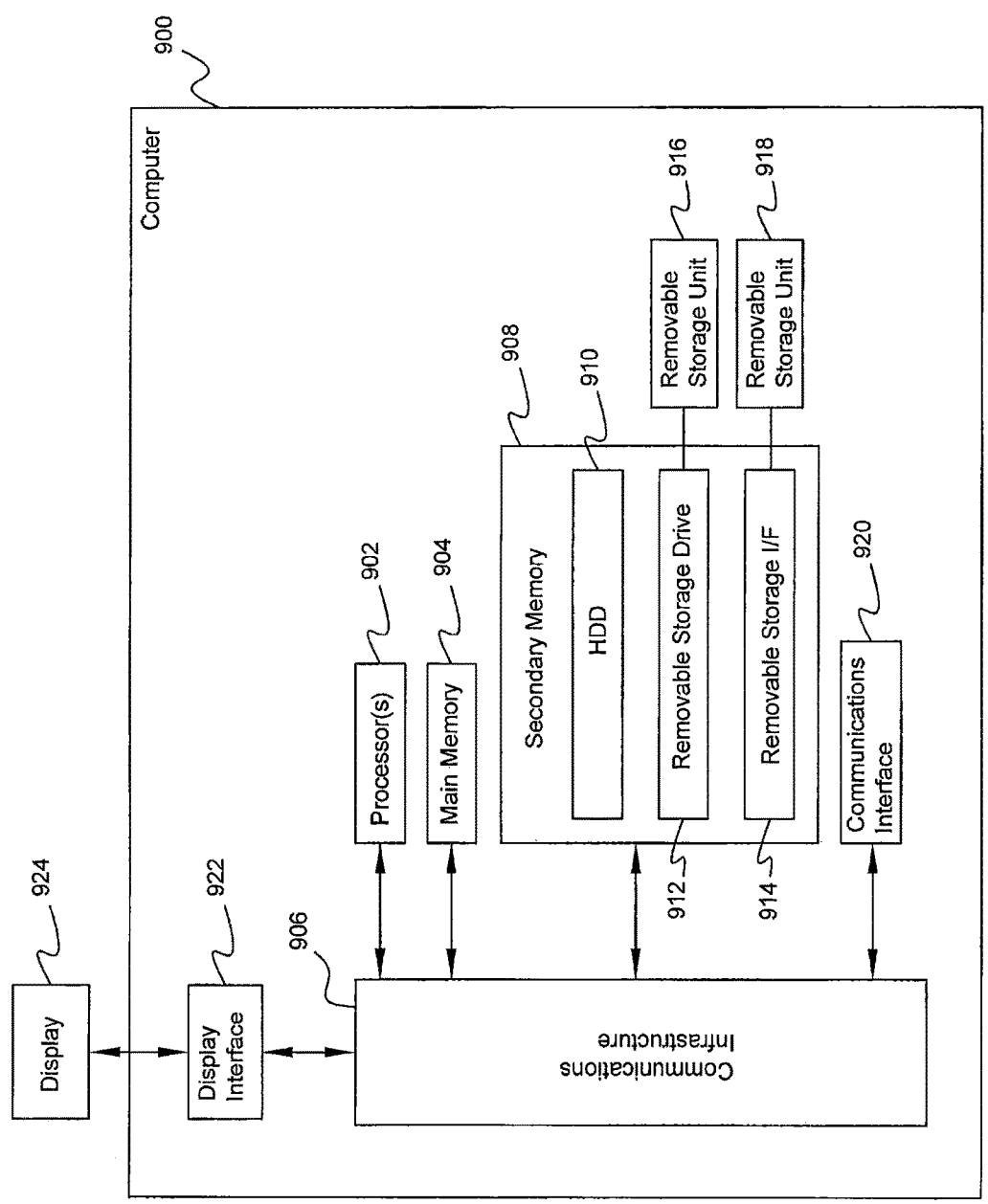
FIG. 9 is a block diagram of a server in accordance with some embodiments.

FIG. 9 is a block diagram of an example architecture for a server (e.g., RP server 760) in accordance with various embodiments. Computer system 900 may include one or more processors 902. Each processor 902 is connected to a communication infrastructure 906 (e.g., a communications bus, cross-over bar, or network). Computer system 900 may include a display interface 922 that forwards graphics, text, and other data from the communication infrastructure 906 (or from a frame buffer, not shown) for display on the display unit 924.

Computer system 900 may also include a main memory 904, such as a random access memory (RAM), and a secondary memory 908. The secondary memory 908 may include, for example, a hard disk drive (HDD) 910 and/or removable storage drive 912, which may represent a floppy disk drive, a magnetic tape drive, an optical disk drive, a memory stick, or the like as is known in the art. The removable storage drive 912 reads from and/or writes to a removable storage unit 916. Removable storage unit 916 may be a floppy disk, magnetic tape, optical disk, or the like. As will be understood, the removable storage unit 916 may include a computer readable storage medium having tangibly stored therein (embodied thereon) data and/or computer software instructions, e.g., for causing the processor(s) to perform various operations.

In alternative embodiments, secondary memory 908 may include other similar devices for allowing computer programs or other instructions to be loaded into computer system 900. Secondary memory 908 may include a removable storage unit 918 and a corresponding removable storage interface 914, which may be similar to removable storage drive 912, with its own removable storage unit 916. Examples of such removable storage units include, but are not limited to, USB or flash drives, which allow software and data to be transferred from the removable storage unit 916, 918 to computer system 900.

Computer system 900 may also include a communications interface 920. Communications interface 920 allows software and data to be transferred between computer system 900 and external devices. Examples of communications interface 920 may include a modem, Ethernet card, wireless network card, a Personal Computer Memory Card International Association (PCMCIA) slot and card, or the like. Software and data transferred via communications interface 920 may be in the form of signals, which may be electronic, electromagnetic, optical, or the like that are capable of being received by communications interface 920. These signals may be provided to communications interface 920 via a communications path (e.g., channel), which may be implemented using wire, cable, fiber optics, a telephone line, a cellular link, a radio frequency (RF) link, Wi-Fi and other communication channels.

In this document, the terms "computer program medium" and "non-transitory computer-readable storage medium" refer to media such as, but not limited to, media at removable storage drive 912, or a hard disk installed in hard disk drive 910, or removable storage unit 916. These computer program products provide software to computer system 900. Computer programs (also referred to as computer control logic) may be stored in main memory 904 and/or secondary memory 908. Computer programs may also be received via communications interface 920. Such computer programs, when executed by a processor, enable the computer system 900 to perform the features of the methods discussed herein. For example, main memory 904, secondary memory 908, or removable storage units 916 or 918 may be encoded with computer program code (instructions) for performing operations corresponding to various processes disclosed herein.

Figure 10:
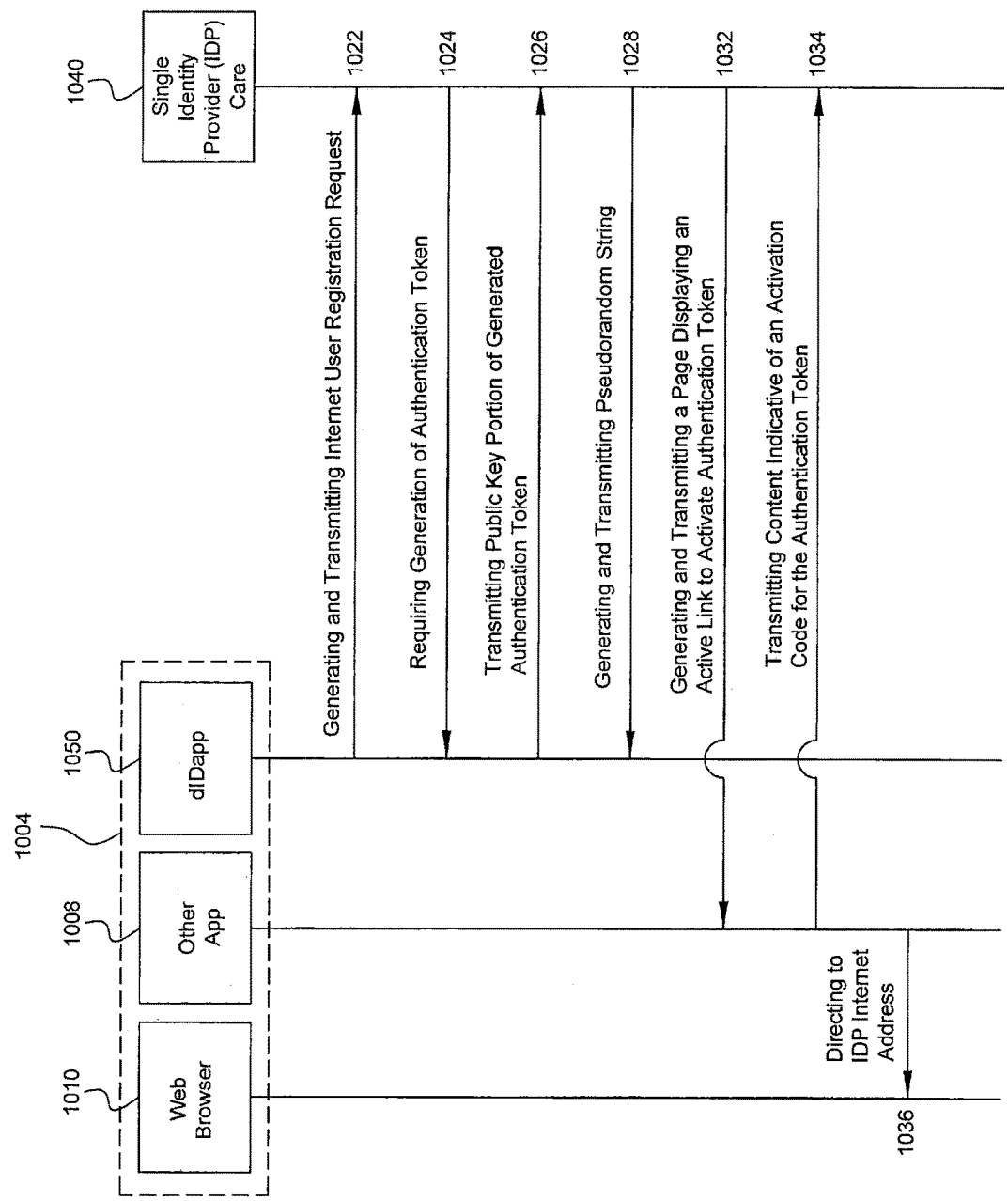
FIG. 10 is a flow chart illustrating a computer-implemented method of authorizing respective access by each of a plurality of Internet users to a respective one or more Internet services provided by each of a plurality of Internet service providers according to some embodiments.

With reference now to FIG. 10, a flow chart illustrating a computer-implemented method of authorizing respective access by each of a plurality of Internet users to a respective one or more Internet services provided by each of a plurality of Internet service providers according to some embodiments is provided. At block 1022, and as shown in the example of FIG. 6B, dID app 1050 residing on a device 1004 may display a page to receive an input of a user identifier (e.g. an email address) of the Internet user in response to receiving an Internet user request to register on a page of dID app 850 (e.g. FIG. 6A) and may generate and transmit an Internet user registration request including the user identifier (e.g. an email address) via an API call to single IDP service core 1040. At block 1024, in response to receiving the Internet user registration request, single IDP service core 1040 requires dID app 1050 to generate, and transmit to dID app 1050 via an API call, a page to receive an input of a user credential (e.g. an Internet user selected personal identification number (PIN) and/or a biometric factor of the Internet user). At block 1026, dID app 1050 transmits the public key portion of the dID app 1050 created authentication token via an API call to the single IDP service core 1040.

At block 1028, in response to receiving the public key portion of the dID app 1050 created authentication token, single IDP service core 1040 generates a pseudorandom string (e.g. a pseudorandom string that is usable by dID app 1050 with the dID app 1050 received user credential to generate an encryption key to encrypt the private key portion of the dID app 1050 created authentication token) and transmits the pseudorandom string via an API call to the dID app 1050. At block 1032, and as shown in the example of FIG. 6D, in response to receiving the public key portion of the dID app 1050 created authentication token and in an out-of-band interaction from dID app 1050, single IDP service core 1040 generates, and transmits to another application 1008 residing on a device 1004 (e.g. an electronic mail application, an Internet user account at a website of the single IDP accessible by a web browser application), a page to receive an input from an Internet user including an active link to activate a dID app 1050 created authentication token. At block 1034, the another application 1008 residing on a device 1004, in an out-of-band interaction from dID app 1050, transmits content indicative of a single IDP service core 1040 generated pseudorandom activation code that is usable to activate the dID app 1050 created authentication token. At block 1036, as shown in the example of FIG. 6E, in an out-of-band interaction from dID app 1050, a web browser 1010 residing on a device 1004 is directed to a web page of the website of the single IDP (150, 250) in response to receiving a signal from the another application 1008 residing on a device 1004 that is indicative of an Internet user's selection of the active link displayed on a page by the another application 1008. (e.g. Block 1032, FIG. 6D).

Figure 11:
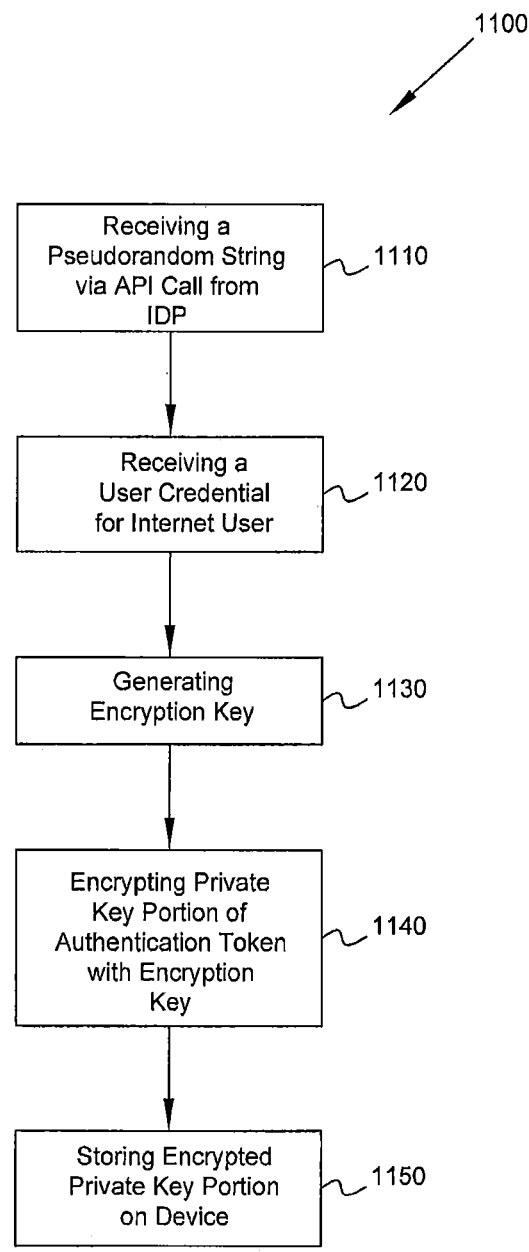
FIG. 11 is a flow chart illustrating a computer-implemented method according to some embodiments of the present disclosure.

Referring to FIG. 11, a flow chart illustrating a computer-implemented method 1100 according to some embodiments of the present disclosure is provided. At block 1110, a dID app (e.g. 850) receives a pseudorandom string via an API call from IDP service core 150-N of the single IDP. At block 1120, the dID app receives a user credential for an Internet user. At block 1130, the dID app generates a cryptographically secure encryption key using the received pseudorandom string and the received user credential of the Internet user. At block 1140, the dID app encrypts the private key portion of an authentication token generated by the dID app using the generated encryption key. At block 1150, the dID app stores the encrypted private key portion of the authentication token generated by the dID app in memory 840 on a device (804, 104, 106).

Figure 12:
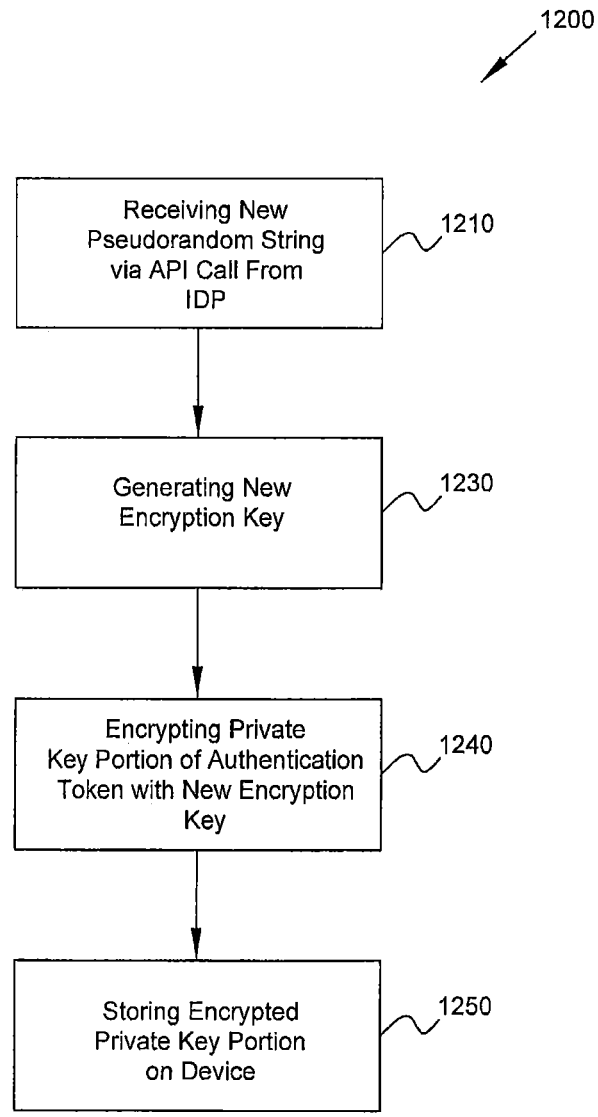
FIG. 12 is a flow chart illustrating a computer-implemented method according to some embodiments.

Referring to FIG. 12, a flow chart illustrating a computer-implemented method according to some embodiments is provided. At block 1210, a dID app (e.g. 850) receives a new pseudorandom string via an API call from IDP service core 150-N of the single IDP. At block 1230, the dID app generates a new cryptographically secure encryption key using the received pseudorandom string and a received user credential of the Internet user. At block 1240, the dID app encrypts the private key portion of an authentication token generated by the dID app using the newly generated encryption key. At block 1250, the dID app stores the newly encrypted private key portion of the authentication token generated by the dID app in memory 840 on a device (804, 104, 106). In various embodiments, the dID app performs the method 1200 at a predetermined periodicity (e.g. after a predetermined number of authentications, after the expiration of a predetermined period of time, after the expiration of a predetermined amount of time from the last authentication) and in response to receiving a new pseudorandom string via an API call from IDP service core 150-N of the single IDP.

Figure 13:
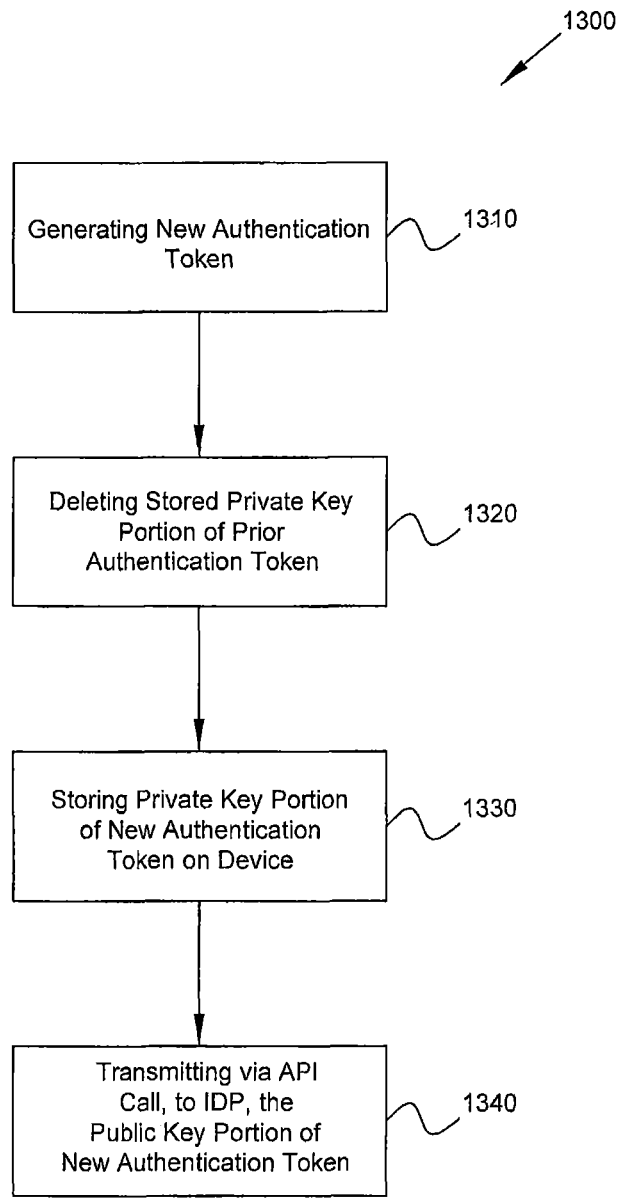
FIG. 13 is a flow chart illustrating a computer-implemented method according to some embodiments of the present disclosure.

Referring to FIG. 13, a flow chart illustrating a computer-implemented method according to some embodiments of the present disclosure is provided. At block 1310, a dID app (e.g. 850) generates a new authentication token. At block 1320, the dID app deletes the stored private key portion of a prior generated authentication token. At block 1330, the dID app encrypts the private key portion of the new generated authentication token (e.g. using the user credential and hardware controlled key store, using a dID app generated encryption key). At block 1340, the dID app stores the encrypted private key portion of the new generated authentication token in memory (e.g. 840) on device (e.g. 804, 104, 106). In various embodiments, the dID app performs the method 1300 at a predetermined periodicity (e.g. after a predetermined number of authentications, after the expiration of a predetermined period of time, after the expiration of a predetermined amount of time from the last authentication).

In some embodiments, one or more steps of the methods described herein can be implemented by a computer processor programmed in accordance with the principals discussed herein. Digital computer systems programmed to perform particular functions pursuant to instructions from program code that implements features of the methods described herein are special-purpose computers particular to the methods described herein. When the programs are to be run, they will be loaded either from their distribution medium or their intermediate storage medium into the execution memory of the computer, configuring the computer to act in accordance with the method of this invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that certain of the described program components and systems can generally be integrated together in a single software product being executed in one or more networks or packaged into multiple software products for execution in the one or more networks.

It is understood by those familiar with the art that the methods described herein may be implemented in hardware, firmware, or software encoded on a non-transitory computer-readable storage medium.

The systems and processes are not limited to the specific embodiments described herein. In addition, components of each system and each process can be practiced independent and separate from other components and processes described herein.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What we claim is:

1. A system for authorizing respective access by each of a plurality of Internet users to a respective plurality of Internet services, comprising:
   a processor at a single identity provider;
   a first non-transitory computer readable storage device of the single identity provider, wherein the first non-transitory computer readable storage device is configured to store data, and wherein the stored data comprises:
      for each of a plurality of Internet users, a respective public key portion of a respective authentication token, wherein the respective authentication token is specific to a user credential of the Internet user and to an identity provider application of the single identity provider residing on a computing device of one or more devices of the Internet user and that is configured to be used by the Internet user to receive authorized access to each of a plurality of Internet services;
      for each one of the respective plurality of Internet services, a respective identifier, and a respective one or more call-back Internet addresses;
   a second non-transitory machine-readable storage device of the single identity provider, wherein the second non-transitory computer readable storage device is encoded with program code executable by the processor for:
      requiring the respective single identity provider application residing on each of the respective computing devices of the plurality of Internet users to create the respective authentication token, to store a respective private key portion of the respective authentication token on the respective computing device, and to prevent transmission of the respective private key portion of the respective authentication token from the respective computing device;
      for each selection by a respective Internet user of a respective one Internet service of the respective plurality of Internet services, receiving, via a respective application programming interface (API) call from a computer server, a respective identifier for the respective selected one Internet service; and
      in response to receiving each of the respective identifiers, requiring the respective single identity provider application residing on the respective computing device of each of the selecting Internet users to validate a respective received user credential using the respective stored private key portion of the respective authentication token for the respective selecting Internet user;
      receiving a respective approved authentication challenge message from the respective single identity provider application residing on the respective computing device of each of a plurality of the selecting Internet users;
      validating a plurality of the received approved authentication challenge messages using the respective stored public key portion of the respective authentication token for each of the plurality of the selecting Internet users, and;
      in response to validating the plurality of received approved authentication challenge messages, authorizing access by at least one of the respective selecting Internet users to the respective selected one Internet service by re-directing a respective web browser residing on a device of the respective one or more devices of the at least one of the respective selecting Internet users to a respective one of the respective stored one or more call-back Internet addresses for the respective selected one Internet service.

2. The system of claim 1, wherein the second non-transitory computer readable storage device is further encoded with program code executable by the processor for:
   repudiating at least one of the received approved authentication challenge messages using the respective stored public key portion of the respective authentication token of the respective selecting Internet user; and
   denying access by the respective selecting Internet user to the respective selected one Internet service in response to repudiating the at least one of the received respective approved authentication challenge messages.

3. The system of claim 1, wherein each of the respective plurality of Internet services is provided by a different relying party of a plurality of relying parties and wherein the provider of the respective selected one Internet service is one of the plurality of relying parties.

4. The system of claim 3, wherein the stored data further comprises, for each of the plurality of relying parties, a respective identifier that is visually perceptible when displayed on a page of the single identity provider application and when displayed on a web page belonging to the single identity provider; and wherein the second non-transitory computer readable storage device is further encoded with program code executable by the processor for automatically generating, and transmitting, to a respective web browser residing on a device of the respective one or more devices of the respective selecting Internet user, a respective web page belonging to the single identity provider that displays:
   the respective visually perceptible identifier of the respective relying party; and
   a respective Internet address of the respective web page belonging to the respective relying party.

5. The system of claim 1, wherein the second non-transitory computer readable storage device is further encoded with program code executable by the processor for:
   automatically generating, and transmitting, via an API call, to a single identity provider application residing on a respective computing device of an Internet user, a pseudorandom string; and
   requiring the respective identity provider application residing on the respective computing device to:
      generate an encryption key using the transmitted pseudorandom string and the user credential of the Internet user;
      encrypt the private key portion of the authentication token of the Internet user using the generated encryption key; and
      store the encrypted private key portion of the authentication token on the computing device of the Internet user.

6. The system of claim 5, wherein the second non-transitory computer readable storage device is further encoded with program code executable by the processor for:
   executing the program code for automatically generating and transmitting a new pseudorandom string at a predetermined periodicity; and requiring the single identity provider application residing on the computing device of the Internet user to perform the generating, encrypting, and storing steps using each transmitted new pseudorandom string.

7. The system of claim 1, wherein the second non-transitory computer readable storage device is further encoded with program code executable by the processor for requiring the respective single identity provider application residing on the respective computing device of each of a plurality of the selecting Internet users to display a respective page configured to receive the respective received user credential.

8. The system of claim 1, wherein the second non-transitory computer readable storage device is further encoded with program code executable by the processor for:
requiring the respective single identity provider application residing on the respective computing device of each of the selecting Internet users to repudiate a respective received user credential that fails to be usable to decrypt the respective stored private key portion of the respective authentication token for the respective selecting Internet user; and
receiving, from the single identity provider application residing on the computing device of a selecting Internet user, an indication that the received user credential was repudiated and, in response to receiving the indication, denying access by the selecting Internet user to the selected one Internet service.

9. The system of claim 1, wherein the user credential comprises a PIN, a biometric factor, or combinations thereof.

10. The system of claim 1, wherein the computer server is of a provider of the respective selected one Internet service.

11. A non-transitory computer readable storage device encoded with program code, wherein, when the program code is executed by a processor of a computing device, the processor performs a method comprising:
an identity provider application of a single identity provider residing on the computing device:
creating an authentication token comprising a public key portion and a private key portion, wherein the created authentication token is specific to the single identity provider application;
storing the private key portion of the created authentication token in a memory of the computing device; and
transmitting, via an application programming interface (API) call to a computer server of the single identity provider, only the public key portion of the created authentication token;
in an out-of-band interaction with other than the single identity provider application, a web browser of the computing device receiving a selection of a link on a web page identifying a respective one of a plurality of Internet services, and, in response to receiving the selection of the link on the web page, the web browser transmitting an electronic signal indicative of an Internet user identifier to the computer server of the single identity provider;
in response to receiving an API call from the computer server of the single identity provider, the single identity provider application:
displaying a page to receive an Internet user input;
validating a received Internet user input by attempting to decrypt the stored private key portion of the created authentication token; and
if the received input is validated, transmitting an approved authentication challenge message via an API call to the computer server of the single identity provider; and
in response to receiving another API call from the computer server of the single identity provider indicating successful validation of the transmitted authentication challenge message, the single identity provider application authorizing access by the Internet user to the selected one of the plurality of Internet services by re-directing the web browser to a call-back Internet address of, and displaying content of, another web page for the selected one of the plurality of Internet services.

12. The non-transitory computer readable storage device of claim 11, wherein, when the program code is further executed by the processor of the computing device, the processor performs the method further comprising:
the single identity provider application:
receiving an Internet user credential;
encrypting the private key portion of the created authentication token using the received Internet user credential; and
storing the encrypted private key portion of the created authentication token in the memory of the computing device.

13. The non-transitory computer readable storage device of claim 11, wherein, when the program code is further executed by the processor of the computing device, the processor performs the method further comprising:
in response to receiving the selection of the link on the web page, the web browser transmitting to a web server content indicative of a respective identifier for the selected one of the plurality of Internet services, and wherein the API call is received by the single identity provider application and from the computer server of the single identity provider based on to the transmitted Internet user identifier and the transmitted content.

14. The non-transitory computer readable storage device of claim 11, wherein when the program code is further executed by the processor of the computing device, the processor performs the method further comprising:
another application residing on the computing device, in an out-of-band interaction with other than the single identity provider application:
transmitting, to the computer server of the single identity provider, an electronic signal including content indicative of an activation code for the created authentication token of the Internet user; and
directing the web browser of the computing device, to an Internet address, and displaying content of, a web page belonging to the single identity provider to activate the created authentication token of the Internet user.

15. The non-transitory computer readable storage device of claim 11, wherein when the program code is further executed by the processor of the computing device, the processor performs the method further comprising:
the single identity provider application:
receiving, at a predetermined periodicity via an API call from the computer server of the single identity provider, a respective predefined pseudorandom string; and
generating a new encryption key using the received respective pseudorandom string and a user credential of the Internet user; and encrypting the private key portion of the created authentication token using the generated new encryption key.

16. The non-transitory computer readable storage device of claim 11, wherein when the program code is further executed by the processor of the computing device, the processor performs the method further comprising:

the single identity provider application:
performing the step of creating the authentication token at a predetermined periodicity so that the single identity provider application periodically creates a new authentication token;
deleting the stored private key portion of the prior created authentication token;
storing the private key portion of the new created authentication token in the memory of the computing device; and
transmitting, via an application programming interface (API) call to the computer server of the single identity provider, only the public key portion of the new created authentication token.

17. A system for authorizing respective access by each of a plurality of Internet users to a respective plurality of Internet services, comprising:
a processor at a single identity provider;
a first non-transitory computer readable storage device of the single identity provider, wherein the first non-transitory computer readable storage device is configured to store data, and wherein the stored data comprises:
for each of a plurality of Internet users, a respective public key portion of a respective authentication token, wherein the respective authentication token is specific to:
a credential of the Internet user, and an identity provider application of the single identity provider residing on a computing device of one or more devices of the Internet user and that is configured to be used by the Internet user to receive authorized access to each of a plurality of Internet services;
a second non-transitory machine-readable storage device of the single identity provider, wherein the second non-transitory computer readable storage device is encoded with program code executable by the processor for:
requiring the respective single identity provider application residing on each of the computing devices to create the respective authentication token, to store a respective private key portion of the respective created authentication token on the respective computing device, and to prevent transmission of the respective private key portion of the respective created authentication token from the respective computing device, wherein the respective stored private key portion of each of the created authentication tokens is configured to be decrypted by the credential of the respective Internet user that is received by the respective single identity provider application;
requiring the respective single identity provider application residing on each of the computing devices to create a new respective authentication token at a predetermined periodicity, to delete the respective stored private key portion of the prior respective authentication token, to store a respective private key portion of the new respective created authentication token on the respective computing device, and to prevent transmission of the respective private key portion of the new respective created authentication token from the respective computing device, wherein the respective stored private key portion of each of the new created authentication tokens is configured to be decrypted by the credential of the respective Internet user that is received by the respective single identity provider application;
deleting the respective stored public key portion of the prior respective authentication token for each of the plurality of Internet users from the stored data;
storing the respective public key portion of the new respective created authentication token for each of the plurality of Internet users in the stored data; and
authorizing respective access by two or more of the plurality of Internet users to a respective selected one of the respective plurality of Internet services in response to validating respective approved authentication challenge messages received in a respective API call from the respective single identity provider application residing on the respective computing device of each of the two or more Internet users using the respective stored public key portion of the respective new created authentication token for each of the two or more Internet users, wherein each respective approved authentication challenge message comprises an indication of successful decryption of the respective stored private key portion of the respective new created authentication token for the respective Internet user.

18. The system of claim 17, wherein the stored data in the first non-transitory computer readable storage device of the single identity provider further comprises, for each one of the respective plurality of Internet services, a respective identifier, and a respective one or more call-back Internet addresses, and wherein the second non-transitory computer readable storage device is further encoded with program code executable by the processor for:
validating respective information received from a respective computer server of a respective provider of each selected one of the respective plurality of Internet services using the respective stored identifier for each respective selected one Internet service; and
wherein the step of authorizing respective access by the two or more Internet users further comprises re-directing a respective web browser residing on the respective computing device of each of the two or more Internet users to a respective one of the respective stored one or more call-back Internet addresses for the respective selected one Internet service; and wherein the step of authorizing respective access by the two or more Internet users is further in response to the validating the respective information received from the respective computer server of the respective provider of each respective selected one Internet service.

19. The system of claim 18, wherein the second non-transitory computer readable storage device is further encoded with program code executable by the processor for:
automatically generating, and transmitting via a respective API call to the respective single identity provider application residing on the respective computing device of each of the two or more Internet users, a respective page that displays:
an Internet address of a web page displayed on the web browser of the computing device of the Internet user to request access by the Internet user to the selected one Internet service by selection of a corresponding link on the web page, wherein each of the plurality of Internet services is provided by a different relying party;
 a time identifier of the Internet user selection of the link corresponding to the selected one Internet service on the web page; and
 a status identifier of authorizing access by the Internet user to the selected one Internet service; and
in response to authorizing respective access by each of the two or more Internet users to the respective selected one Internet service, re-directing a respective web browser on the respective computing device of the respective Internet user to the respective one of the respective one or more call-back Internet addresses for the respective selected one Internet service.

20. The system of claim 17, wherein the stored data in the first non-transitory computer readable storage device of the single identity provider further comprises, for each of the plurality of Internet users, a respective counter value, and wherein the second non-transitory computer readable storage device is further encoded with program code executable by the processor for:
 in response to authorizing respective access by the two or more Internet users, incrementing the respective counter value in the stored data for each of the two or more Internet users, and wherein the step of authorizing respective access by the two or more Internet users further comprises using the respective stored public key portion of the respective authentication token, and the respective stored counter value, for each of the two or more Internet users.

\* \* \* \* \*